United States Patent [19]

Saito et al.

[11] 4,316,251
[45] Feb. 16, 1982

[54] ELECTRIC CONTROL METHOD FOR AUTOMOBILE AIR CONDITIONER

[75] Inventors: Atsunori Saito; Masanaori Naganoma, both of Kariya; Yasuhiro Iwata, Aichi; Kiyoshi Usami, Obu, all of Japan

[73] Assignee: Nippondenso Co., Ltd., Kariya, Japan

[21] Appl. No.: 199,920

[22] Filed: Oct. 23, 1980

Related U.S. Application Data

[63] Continuation of Ser. No. 79,260, Sep. 27, 1979, abandoned.

[30] Foreign Application Priority Data

Oct. 2, 1978 [JP] Japan ................................ 53-121855

[51] Int. Cl.$^3$ .......................... G06F 15/20; B60H 3/00
[52] U.S. Cl. ...................................... 364/424; 165/42; 237/5; 364/418
[58] Field of Search ...................... 364/418, 424, 425; 165/41, 42; 237/5, 28, 32

[56] References Cited

U.S. PATENT DOCUMENTS

| | | | |
|---|---|---|---|
| 3,906,207 | 9/1975 | Rivere et al. | 364/425 |
| 3,948,312 | 4/1976 | Nisbet | 165/42 |
| 3,983,930 | 10/1976 | Franz | 165/42 |
| 4,123,796 | 10/1978 | Shih | 364/418 |

*Primary Examiner*—Errol A. Krass
*Attorney, Agent, or Firm*—Cushman, Darby & Cushman

[57] ABSTRACT

In an electric control method for an automobile air conditioner, a digital computer is utilized to calculate a function required to direct the actual in-car temperature toward a desired value in consideration with various changes of ambient temperature and the calculation is compensated to effectively reduce a difference between the actual in-car temperature and the desired value when the rate of change of the actual in-car temperature becomes below a predetermined value.

9 Claims, 16 Drawing Figures

ELECTRIC CONTROL METHOD FOR AUTOMOBILE AIR CONDITIONER

This is a continuation of application Ser. No. 79,260 filed Sept. 27, 1979, now abandoned.

BACKGROUND OF THE INVENTION

The present invention relates to automobile air conditioners, and more particularly to an electric control method for an automobile air conditioner in which a commercially available digital computer is employed to direct and maintain the actual in-car temperature toward and in a desired value.

SUMMARY OF THE INVENTION

The primary object of the present invention is to provide an electric control method for an automobile air conditioner in which a digital computer is utilized to calculate a function required to direct the actual in-car temperature toward a desired value in consideration with various changes of ambient temperature and in which the calculation is compensated to effectively reduce a difference between the actual in-car temperature and the desired value when the rate of change of the actual in-car temperature becomes below a predetermined value.

Another object of the present invention is to provide an electric control method for an automobile air conditioner in which operation of the compressor is controlled in accordance with each difference between the actual in-car temperature and a desired in-car temperature and between the desired in-car temperature and the actual temperature outside the automobile to thereby avoid undesired power losses of the prime mover.

A further object of the present invention is to provide an electric control method for an automobile air conditioner capable of controlling discharge of the conditioned air into the upper and lower portions of the passenger compartment in accordance with changes of the actual in-car temperature and the actual temperature outside the automobile.

In a preferred embodiment of the present invention there is provided an electric control method for an automobile air conditioner including an air duct for allowing the flow of air into a passenger compartment of the automobile, an evaporator arranged within the air duct and connected with a refrigerant compressor for cooling the air flowing therethrough, a heater arranged within the air duct for warming a portion of the cooled air flowing through the evaporator into the compartment, an air-blend door arranged between the evaporator and the heater for controlling an amount of the cooled air flowing through the heater and controlling an amount of the cooled air directly flowing into the compartment, and control means for controlling the opening degree of the air-blend door to direct the actual in-car temperature toward a desired temperature, the method comprising the steps of:

producing a first electric binary signal indicative of the actual in-car temperature;
producing a second electric binary signal indicative of the actual temperature outside the automobile;
calculating a value indicative of an estimated temperature required to direct the actual in-car temperature toward the desired temperature by a digital computer programmed to calculate the value from a function describing a desired relationship between the estimated temperature and an in-car temperature in consideration with a temperature outside the automobile, the calculation being performed by using the first and second binary signals;
calculating a deviation between the desired temperature and the estimated temperature by the digital computer programmed to calculate the deviation on the basis of the previous calculated value;
producing an output signal from the digital computer when the deviation is out of a first predetermined range and ceasing the output signal when the deviation is in the first predetermined range, the output signal being applied to the control means to direct the actual in-car temperature toward the desired temperature;
discriminating by the digital computer whether or not a difference between the desired temperature and the actual in-car temperature is in a second predetermined range when the rate of change of the actual in-car temperature is below a predetermined value, the digital computer being programmed to perform the discrimination by using the first binary signal;
compensating the estimated temperature to direct the temperature difference into the second predetermined range; and
continuously repeating the above sequence of steps for controlling the actual in-car temperature in response to any changes in the electric binary signals.

In another preferred embodiment of the present invention there is provided an electric control method for an automobile air conditioner including an air duct for allowing the flow of air into a passenger compartment of the automobile, an evaporator arranged within the air duct and connected with a refrigerant compressor for cooling the air flowing therethrough, a heater arranged within the air duct for warming the air flowing therethrough, a control member for controlling a ratio of the cooled air flowing into the compartment against the warmed air flowing into the compartment to maintain the actual in-car temperature in a desired temperature, and an electrically operated clutch means for connecting the compressor to a prime mover of the automobile upon energization thereof and for disconnecting the compressor from the prime mover upon deenergization thereof, the method comprising the steps of:

producing a first electric binary signal indicative of the acutal in-car temperature;
producing a second electric binary signal indicative of the actual temperature outside the automobile;
calculating a first difference between the actual in-car temperature and the desired temperature by a digital computer programmed to calculate the first temperature difference by using the first binary signal and to discriminate whether or not the first temperature difference is in a first predetermined range;
calculating a second difference between the desired temperature and the actual temperature outside the automobile by the digital computer, being further programmed to calculate the second temperature difference by using the second binary signal and to discriminate whether or not the second temperature difference is in a second predetermined range broader than the first predetermined range;
producing a first output signal from the computer when either one of the first and second temperature differences is out of the first or second predetermined range and producing a second output signal from the computer when both the first and second temperature differences are in the first and second predetermined ranges respectively; and energizing the clutch means in response to the first output signal and deenergizing the clutch means in response to the second output signal.

In a further preferred embodiment of the present invention there is provided an electric control method for an automobile air conditioner including:

an air duct for allowing the flow of air into a passenger compartment of the automobile;

a first switch door arranged within the air duct for selectively allowing the flow of inside air recirculated from the compartment and the flow of outside air from the exterior;

an evaporator arranged within the air duct and connected with a refrigerant compressor for cooling the air flowing through the first switch door;

a heater arranged within the air duct for warming a portion of the cooled air flowing through the evaporator into the compartment;

an air-blend door arranged between the evaporator and the heater for controlling an amount of the cooled air flowing through the heater and controlling an amount of the cooled air directly flowing into the compartment;

control means for controlling the opening angle of the air-blend door to maintain the actual in-car temperature in a desired temperature;

a second switch door arranged downstream of the heater for discharging the conditioned air into the lower portion of the compartment at its first position and for discharging the conditioned air into the upper portion of the compartment at its second position; and an electrically operated mechanism for switching-over the second switch door to the second position from the first position upon energization of the mechanism and for switching-over the second switch door to the first position from the second position upon deenergization of the mechanism, the energization of the mechanism being conducted when the actual opening angle of the air-blend door is smaller than a predetermined angle measured from the fully closed position of the air-blend door to isolate the heater from the cooled air, and the deenergization of the mechanism being conducted when the actual opening angle becomes larger than the predetermined angle;

the control method comprising the steps of:

compensating the predetermined angle in relation to changes of the actual in-car temperature and the actual temperature outside the automobile;

producing the first and second output signals respectively when the actual opening angle of the air-blend door is smaller than the compensated angle and is larger than the compensated angle; and selectively conducting energization and deenergization of the electrically operated mechanism in response to the first and second output signals.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
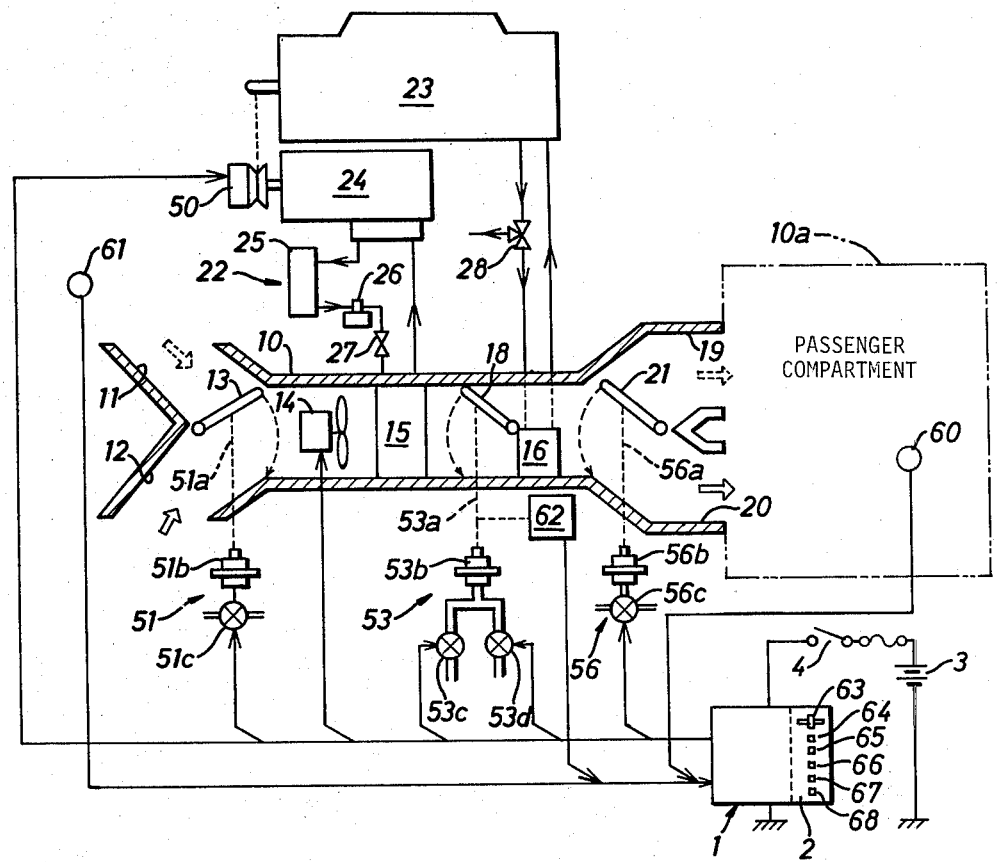
FIG. 1 is a block diagram of a preferred embodiment in accordance with the present invention adapted to an automobile air conditioner.

Referring now to FIG. 1 of the drawings, there is illustrated an electric control apparatus 1 for an automobile air conditioner in accordance with the present invention. The air conditioner comprises an air duct 10 which is provided therein with a first switch door 13 driven by an electrically operated vacuum mechanism 51. The vacuum mechanism 51 includes a servomotor 51b which is provided therein with a servo-chamber 51b formed by a flexible diaphragm, and a compression spring assembled in the servo-chamber to bias the diaphragm upwardly. The flexible diaphragm of servomotor 51b is coupled to the first switch door 13 through a linkage rod 51a, and the servo-chamber of servomotor 51b is connected through a solenoid valve 51c to the exterior and an intake manifold of an internal combustion engine 23 for the automobile.

With the vacuum mechanism 51, the solenoid valve 51c serves to normally supply the atmospheric pressure from the exterior into the servo-chamber of servomotor 51b therethrough. Then, the diaphragm of servomotor 51b is biased by the compression spring such that the linkage rod 51a is located at its upward stroke end to maintain the first switch door 13 at a position shown in FIG. 1. Thus, a second inlet 12 of air duct 10 is opened to take therethrough the air from the exterior into air duct 10. When the solenoid valve 51c is energized by operation of the electric control apparatus 1, as described below, the servo-chamber of servomotor 51b is isolated from the exterior and supplied with vacuum pressure from the engine intake manifold. Then, the linkage rod 51a is moved downward against biasing force of the spring to switch over the first switch door 13. Thus, a first inlet 11 of air duct 10 is opened to take therethrough the air from inside a passenger compartment 10a of the automobile into the air duct 10.

The air conditioner also comprises a blower 14 and an evaporator 15 provided respectively within the air duct 10. The blower 14 receives electric power supply from an electric source 3, as described below, such that it is driven to impel the air from one of inlets 11, 12 toward the evaporator 15. When the evaporator 15 receives the air from blower 14, refrigerant medium in evaporator 15 is warmed by heat of the air to extract heat from the air. The heat-extracted air is applied from evaporator 15 to an air-blend door 18 as the cooled air with temperature of about 0° C., whereas the warmed refrigerant medium is circulated into a refrigerant compressor 24. The compressor 24 includes an electromagnetic clutch 50 which is provided on a shaft of compressor 24. The clutch 50 is coupled to an output shaft of the engine 23 through a V-belt. When the clutch 50 is energized by operation of the electric control apparatus 1, as described below, the compressor 24 is connected to and driven by the engine 23 such that the warmed refrigerant medium from evaporator 15 is compressed to discharge heat therefrom to the exterior. The compressed refrigerant medium is applied through a receiver 26 to an expansion valve 27 and is changed into refrigerant medium with low pressure to be recirculated into the evaporator 15. Additionally, as well known in the prior arts, the evaporator 15 provides a cooling system 22 together with the compressor 24, condenser 25, receiver 26 and expansion valve 27.

The air-blend door 18 is provided within the air duct 10 and coupled to an electrically operated vacuum mechanism 53. The vacuum mechanism 53 includes a servomotor 53b which is provided therein with a servo-chamber formed by a flexible diaphragm, and a compression spring assembled in the servo-chamber to bias the diaphragm upwardly. The flexible diaphragm of servomotor 53b is coupled to the air-blend door 18 through a control rod 53a, and the servo-chamber of servomotor 53b is connected through a solenoid valve 53c to the engine intake manifold and also connected through a solenoid valve 53d to the exterior. The solenoid valves 53c, 53d are respectively of a closed type and selectively energized by operation of the electric control apparatus 1, as described below, to open such that the servo-chamber of servomotor 53b is supplied with one of vacuum pressure and the atmospheric pressure respectively from the engine intake manifold and the exterior.

When the atmospheric pressure appears in the servo-chamber of servomotor 53b, the diaphragm of servomotor 53b is biased by the compression spring to locate the control rod 53a at its upward stroke end. Thus, the air-blend door 18 is maintained at a position or the maximum opening degree shown in FIG. 1 to flow all the cooled air from evaporator 15 toward a second switch door 21 through a heater 16. When vacuum pressure from the engine intake manifold is applied to the servo-chamber of servomotor 53b through the solenoid valve 53c, the control rod 53a is moved in accordance with a difference between biasing force of the compression spring and vacuum pressure in the servo-chamber to pull the air-blend door 18 downwardly. When the servo-chamber of servomotor 53b is blocked by the solenoid valve 53c from vacuum pressure in the engine intake manifold, the movement of control rod 53a is stopped to maintain an opening degree $T_{po}$ of the air-blend door 18 in a value. Thus, the cooled air from the evaporator 15 is partly applied to the heater 16 in accordance with the opening degree of air-blend door 18, and the remainder of the cooled air flows directly toward the second switch door 21. When vacuum pressure from the engine intake manifold is again applied to the servo-chamber of servomotor 53b, the control rod 53a is further moved against biasing force of the compression spring such that the air-blend door 18 is pulled downward to reach the minimum opening degree. Thus, all the cooled air from the evaporator 15 flows directly toward the second switch door 21. In the embodiment, the minimum opening degree of air-blend door 18 is defined as zero %, whereas the maximum opening degree of air-blend door 18 is defined as 100%.

The heater 16 is connected to a coolant system for the engine 23 through a thermostatically operated valve 28. The thermostatically operated valve 28 serves to supply the heater 16 with all the hot water from the engine coolant system while temperature of the hot water is below a predetermined value. When temperature of the hot water from the engine coolant system exceeds the predetermined value, the hot water is partly applied to the heater 16 by the valve 28, and the remainder of the hot water is applied to a radiator for the engine coolant system. The heater 16 receives the hot water from the valve 28 to warm the cooled air therethrough in a substantially constant temperature value. The warmed air by the heater 16 is applied to the second switch door 21.

The second switch door 21 is provided within the air duct 10 and is coupled to an electrically operated vacuum mechanism 56. The vacuum mechanism 56 includes a servomotor 56b which is provided therein with a servo-chamber formed by a flexible diaphragm, and a compression spring assembled in the servo-chamber to bias the diaphragm upwardly. The flexible diaphragm of servomotor 56 is coupled to the second switch door 21 through a linkage rod 56a, and the servo-chamber of servomotor 56b is connected through a solenoid valve 56c to the exterior and the engine intake manifold. With the vacuum mechanism 56, the solenoid valve 56c serves to normally supply the atmospheric pressure from the exterior into the servo-chamber of servomotor 56b therethrough. Then, the diaphragm of servomotor 56b is biased by the compression spring such that the linkage rod 56a is located at its upward stroke end to maintain the second switch door 21 at a position in FIG. 1. Thus, a lower outlet 20 of air duct 10 is opened to discharge therethrough the cooled and warmed air respectively from the evaporator 15 and heater 16 toward a lower portion of the passenger compartment 10a. When the solenoid valve 56c is energized by operation of the electric control apparatus 1, as described below, the servo-chamber of servomotor 56b is isolated from the exterior and supplied with vacuum pressure from the engine intake manifold. Then, the linkage rod 56a is moved downward against biasing force of the spring to switch over the second switch door 21. Thus, an upper outlet 19 of air duct 10 is opened to discharge therethrough the cooled and warmed air respectively from the evaporator 15 and heater 16 toward an upper portion of the passenger compartment 10a.

Figure 2:
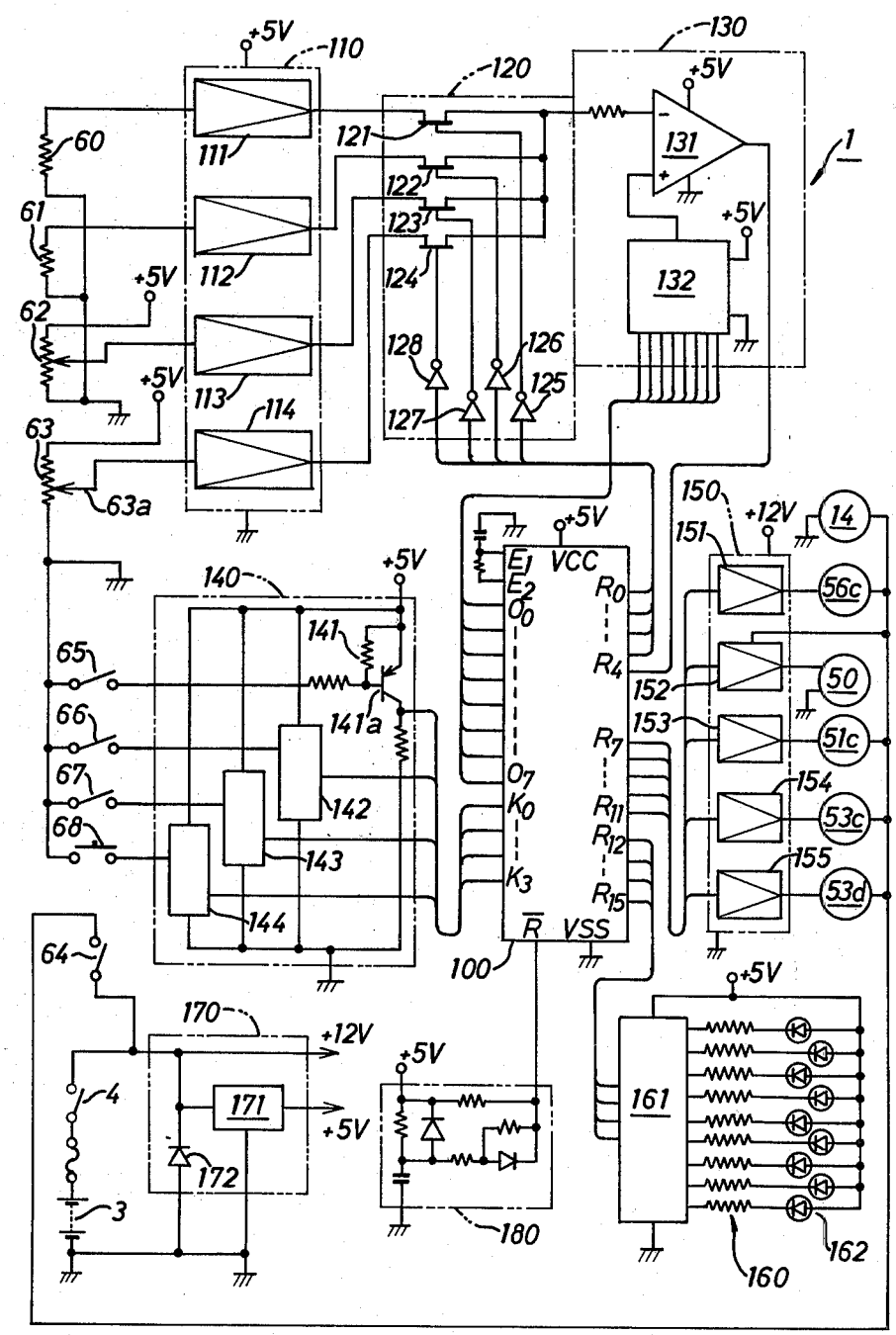
FIG. 2 is a block diagram of the electric control apparatus shown in block form in FIG. 1.

As shown in FIGS. 1 and 2, the electric control apparatus 1 comprises a power supply circuit 170 which is connected through an ignition switch 4 to the electric source 3. The electric source 3 is in the form of a secondary battery with a D.C. output voltage of twelve volts and connected through the ignition switch 4 and a manually operable main switch 64 to the blower 14, solenoid valves 51c, 53c, 53d, 56c. The electric source 3 is also connected to the electromagnetic clutch 50 through the switches 4, 64 and an amplifying circuit 150. When the ignition and main switches 4, 64 are closed, the output voltage from electric source 3 is applied to the blower 14 to drive the same. At the same time, the output voltage from electric source 3 is applied to the solenoid valves 51c, 53c, 53d, 56c and also applied to the clutch 50 through the amplifying circuit 150. Thus, each of the solenoid valves 51c, 53c, 53d, 56c and clutch 50 is ready for its operation. The power supply circuit 170 receives the output voltage from electric source 3 upon closure of ignition switch 4 to produce therefrom a D.C. voltage of twelve volts. In the power supply circuit 170, a voltage stabilizer 171 is connected to the electric source 3 through a diode 172 and the ignition switch 4. The voltage stabilizer 171 receives the D.C. voltage from electric source 3 upon closure of ignition switch 4 to produce therefrom a D.C. constant voltage of five volts.

The electric control apparatus 1 also comprises an amplifying circuit 110 connected to various sensors 60, 61, 62 and a temperature selector 63. The in-car sensor 60 is a thermally sensitive resistance element such as a thermistor having a thermally variable internal resistance. The in-car sensor 60 is provided within the passenger compartment 10a to detect instant temperature $T_r$ of air in the compartment 10a due to change of the internal resistance thereof, the sensor 60 producing an electric signal indicative of the instant in-car temperature $T_r$. The outside ambient sensor 61 is also a thermally sensitive resistance element such as a thermistor having a thermally variable internal resistance. The outside ambient sensor 61 is located adjacent to a grill for the radiator to detect instant ambient temperature $T_{am}$ outside the automobile due to change of the internal resistance thereof, the sensor 61 producing an electric signal indicative of the instant ambient temperature $T_{am}$.

The door position sensor 62 is a potentiometer coupled to the control rod 53a of vacuum mechanism 53. The potentiometer receives the constant voltage from voltage stabilizer 171 and detects a displacement of rod 53a to produce an electric signal indicative of an instant opening degree $T_{po}$ of air-blend door 18. The temperature selector 63 is in the form of a potentiometer having a manually operable slider 63a. When the slider 63a is manipulated to select in-car temperature $T_2$ in a desired value, the sensor 63 produces an electric signal indicative of the selected in-car temperature $T_2$ upon receiving the constant voltage from stabilizer 171. In the embodiment, the temperature selector 63 is assembled together with the main switch 64 and various switches 65 to 68 on a panel 2 of a casing in which the electric control apparatus 1 is accomodated (See FIG. 1). The panel 2 is located adjacent to an instrument panel in the passenger compartment 10a.

Figure 3:
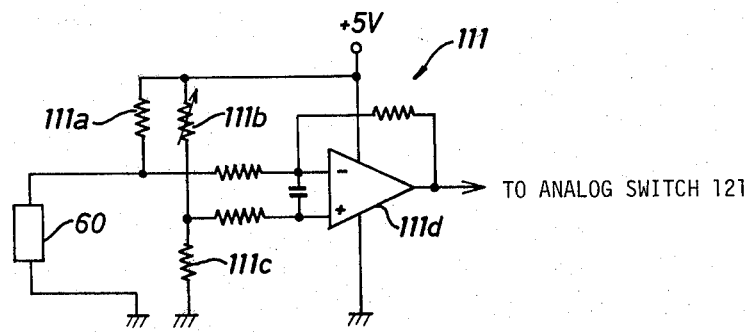
FIGS. 3 and 4 are respectively circuit diagrams of the pre-amplifiers shown in block form in FIG. 2.

The amplifying circuit 110 comprises pre-amplifiers 111 to 114 connected respectively to the sensors 60, 61, 62 and temperature selector 63. As shown in FIG. 3, the pre-amplifier 111 is provided with a resistor 111a connected in series with the in-car sensor 60 and with a variable resistor 111b and a resistor 111c for providing a voltage divider. The constant voltage from stabilizer 171 is applied to the resistor 111a and produced as the electric signal indicative of the instant in-car temperature $T_r$ from the in-car sensor 60. The resistors 111b, 111c receive the constant voltage from stabilizer 171 to produce a reference or divided constant voltage therefrom. In the pre-amplifier 111, a differential amplifier 111d has first and second input terminals connected respectively to the in-car sensor 60 and the resistors 111b, 111c. A difference between a level of the electric signal and the reference voltage respectively from the in-car sensor 60 and resistors 111b, 111c is amplified by the differential amplifier 111d and produced as an electric analog voltage. The pre-amplifier 112 has the same construction and function as those of the pre-amplifier 111. Thus, a level of the electric signal from outside ambient sensor 61 is amplified by the pre-amplifier 112 in the same function as that of the pre-amplifier 111 and is produced as an electric analog voltage.

Figure 4:
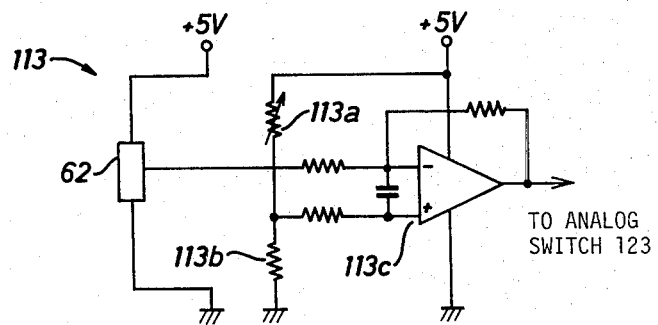

As shown in FIG. 4, the pre-amplifier 113 includes a variable resistor 113a in series with a resistor 113b for providing a voltage divider. The resistors 113a, 113b receive the constant voltage from stabilizer 171 to produce a reference or divided constant voltage therefrom. A differential amplifier 113c has first and second input terminals connected respectively to the door position sensor 62 and the resistors 113a, 113b. A difference between a level of the electric signal and the reference voltage respectively from the sensor 62 and the resistors 113a, 113b is amplified by the differential amplifier 113c and produced as an electric analog voltage. The pre-amplifier 114 has the same construction and function as those of the pre-amplifier 113. Thus, a level of the electric signal from temperature sensor 63 is amplified by the pre-amplifier 114 in the same function as that of the pre-amplifier 113 and is produced an electric analog voltage.

Each of the first to third mode switches 65 to 67 is in the form of a manually operable type and grounded to produce a low level signal therefrom when manually closed. The fourth mode switch 68 is in the form of a push-button type and grounded to produce a low level signal therefrom when temporarily closed. The low level signals from switches 65 to 68 are applied to an amplifying circuit 140. The amplifying circuit 140 includes amplifiers 141 to 144 connected respectively to the first to fourth mode switches 65 to 68. The amplifier 141 include a transistor 141a which as an emitter connected to the voltage stabilizer 171, a base connected through a resistor to the first mode switch 65, and a collector grounded through a resistor. The transistor 141a is turned on upon receiving the low level signal from the switch 65 to produce a high level signal therefrom. When the low level signal from the switch 65 disappears, the transistor 141a is turned off to produce a low level signal therefrom. The remaining amplifiers 142 to 144 have respectively the same construction and function as those of the amplifier 141. Thus, the amplifiers 142 to 144 receive the low level signals from the second to fourth mode switches 66 to 68 respectively to produce high level signals therefrom. When each of the low level signals from switches 66 to 68 disappears, each of the high level signals from the amplifiers 142 to 144 becomes a low level signal. The high and low level signals from amplifiers 141 to 144 are respectively applied to input ports $K_0$ to $K_3$ of a digital computer 100.

The electric control apparatus 1 further comprises an analog multiplexer 120 which is provided with analog switches 121 to 124 respectively in the form of a field effect transistor. The analog switches 121 to 124 are connected at their input terminals respectively to the pre-amplifiers 111 to 114 and connected at their output terminals to an analog-to-digital or A-D converter 130. Control terminals of the analog switches 121 to 124 are also connected respectively through inverters 125 to 128 to input-output or I/O ports $R_0$ to $R_3$ of computer 100. The inverters 125 to 128 function to respectively invert control signals from the I/O ports $R_0$ to $R_3$ of computer 100. The analog switches 121 to 124 are turned on in response to high level signals from inverters 125 to 128 respectively to apply the analog voltages from pre-amplifiers 111 to 114 to the converter 130 therethrough. The analog switches 121 to 124 are also turned off in response to low level signals from inverters 125 to 128 respectively to disconnect the converter 130 from the pre-amplifiers 111 to 114.

The analog-to-digital converter 130 is provided with a comparator 131 having first input terminal connected through a resistor to the output terminals of analog switches 121 to 124 and a second input terminal connected to an output terminal of a voltage generator 132. The voltage generator 132 is in the form of a conventional ladder type and has input terminals connected respectively to output ports $O_0$ to $O_7$ of computer 100. The voltage generator 132 receives a binary code signal from the output ports $O_0$ to $O_7$ of computer 100 to produce an electric analog voltage therefrom. The analog voltage from voltage generator 132 is steppedly increased in accordance with increase of a value of the binary code signal from computer 100. The comparator 131 serves to compare the analog voltage from each analog switch with the analog voltage from voltage generator 132. While the analog voltage from voltage generator 132 is lower than the analog voltage from each analog switch, the comparator 131 produces a low level signal therefrom. When the analog voltage from voltage generator 132 becomes higher than the analog voltage from each analog switch, the comparator 131 produces a high level signal therefrom. The low and high level signals from comparator 131 are applied to an input-output or I/O port $R_4$ of computer 100.

The digital computer 100 is a single chip LSI microcomputer and serves to receive the constant voltage from stabilizer 171 at its terminal VCC as to be ready for its operation. The computer 100 is also reset upon receiving a reset or low level signal from a starter circuit 180 such that high level signals are respectively produced from the input and output ports $K_0$ to $K_3$, $O_0$ to $O_7$ of computer 100 and also produced from input-output or I/O ports $R_0$ to $R_4$, $R_7$ to $R_{15}$ of computer 100. The starter circuit 180 serves to produce the reset signal therefrom upon receiving the constant voltage from voltage stabilizer 171, the reset signal having a predetermined duration. The digital computer 100 comprises a central processing unit or CPU which is connected to the input ports $K_0$ to $K_3$, output ports $O_0$ to $O_7$ and I/O ports $R_0$ to $R_4$, $R_7$ to $R_{15}$ of computer 100. CPU is also connected to a clock circuit, a read only memory or ROM, a random access memory or RAM, and first and second timers. CPU serves to execute a predetermined program in accordance with clock signals from the clock circuit. The clock circuit is cooperable with an oscillator, having a resistor and a capacitor, to produce the clock signals at a predetermined frequency. The first timer is in the form of a counter and cooperable with RAM to count clock signals from the clock circuit in a time interval of two minutes. The second timer is also in the form of a counter and cooperable with RAM to count clock signals from the clock circuit in a time interval of ten minutes.

The above-noted predetermined program is previously stored in ROM to be executed in the computer 100 as in the followings.

(1) CPU starts operation of the first timer in computer 100 and determines a first compensation variable $C_F$ described below as an initial value indicative of zero to be stored in RAM.

(2) CPU produces a control or low level signal at each of the I/O ports $R_0$ to $R_3$ of computer 100. CPU also produces a binary code signal at the output ports $O_0$ to $O_7$ in response to the low level and clock signals respectively from the comparator 131 and clock circuit. Increase of a value of the binary code signal is conducted by CPU in accordance with increase of clock signals from the clock circuit and ceased in response to the high level signal from comparator 131. The binary code signal with the increased value is stored by CPU in RAM in response to the high level signal from comparator 131 as a binary code signal corresponding with each analog voltage from each analog switch. In this embodiment, when the analog switch 121 produces the instant analog voltage immediately after start of the first timer, the above-noted binary code signal with the increased value is stored in RAM as a binary code signal indicative of initial in-car temperature $T_{ro}$.

Figure 7:
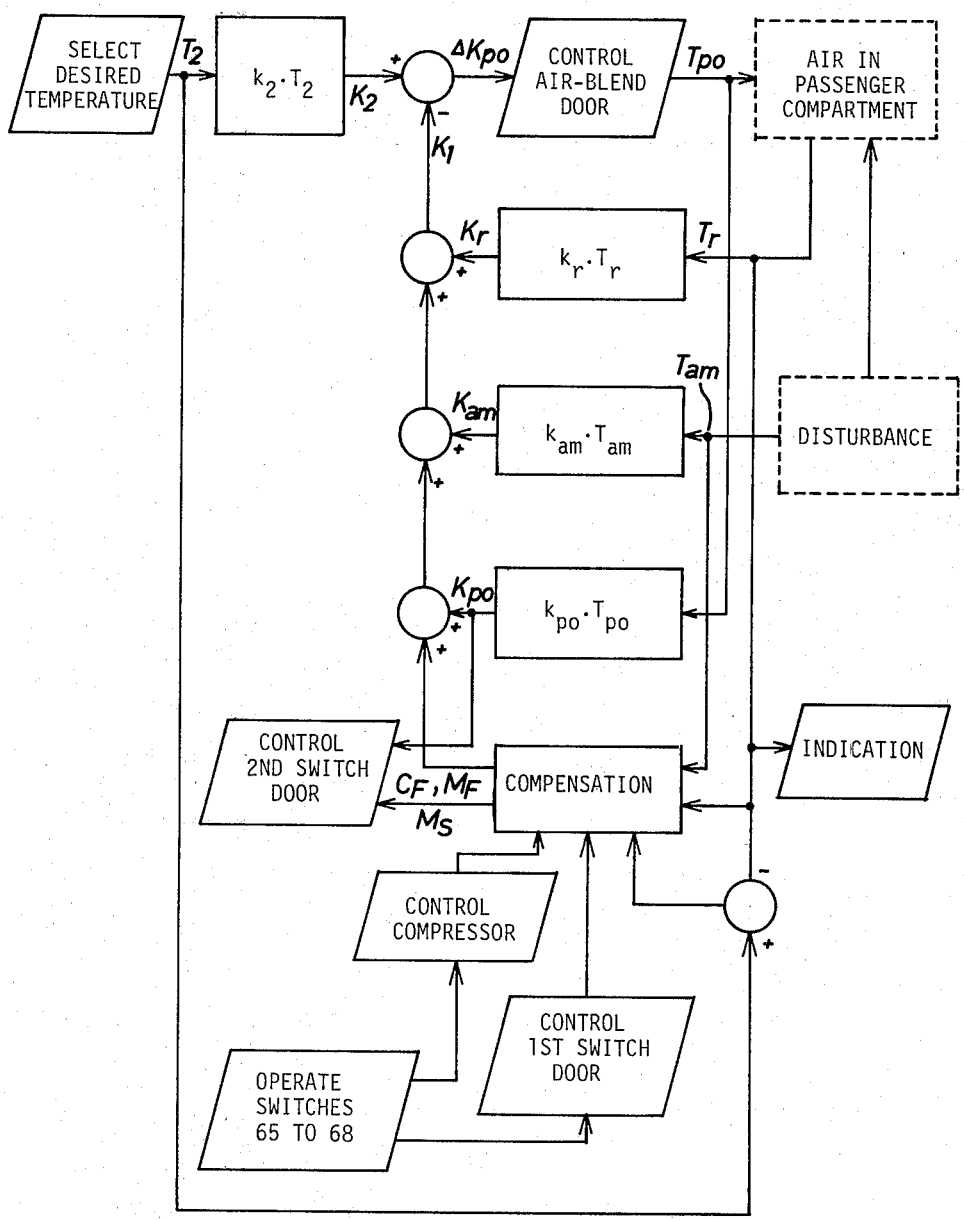
FIG. 7 is a diagram illustrating operation of the electric control apparatus in relation to the air conditioner.

(3) A value of a first feed-back variable $K_r$ is, as shown in FIG. 7, calculated by CPU from the following equation (1) in accordance with the binary code signal indicative of the in-car temperature $T_r$ from RAM and an in-car temperature coefficient $k_r$, the calculated value of the variable $K_r$ being stored in RAM.

$$K_r = k_r \cdot T_r \ldots \quad (1)$$

The coefficient $k_r$ is experimentally determined in consideration with performance of the air conditioner and previously stored in ROM together with the equation (1). A value of a variable $M_i$ is calculated by CPU from the following equation (2) in accordance with the binary code signal indicative of the in-car temperature $T_r$ from RAM and a coefficient $\alpha$, the calculated value of the variable $M_i$ being stored in RAM.

$$M_i = \alpha \cdot T_r \ldots \quad (2)$$

The coefficient $\alpha$ is experimentally determined in consideration with the performance of the air conditioner such that opening degree of the air-blend door 18 may be controlled under deactivation of the compressor 24 to approach temperature of air through the evaporator 15 from the first inlet 11 toward 0° C. The coefficient $\alpha$ and equation (2) are respectively stored in ROM previously.

A value of a variable $M_{si}$ is also calculated by CPU from the following equation (3) in accordance with the binary code signal indicative of the in-car temperature $T_r$ from RAM and a coefficient $\beta$, the calculated value of the variable $M_{si}$ being stored in RAM.

$$M_{si} = \beta \cdot T_r \ldots \quad (3)$$

The coefficient $\beta$ is experimentally determined in consideration with the performance of the air conditioner such that under deactivation of the compressor 24, a predetermined relationship defining switch-over timing of the second switch door 21 may be compensated on a basis of temperature of air through the evaporator 15 from the first inlet 11 to ensure switch-over of the door 21 at predetermined temperature 30° C. of air discharged into the compartment 10a. The above-noted predetermined relationship means that predetermined opening degree D of the air-blend door 18 corresponds with the predetermined temperature 30° C. of air discharged into the compartment 10a under activation of the compressor 24. The coefficient $\beta$ and equation (3) are previously stored in ROM respectively. The predetermined door opening degree D is also stored in ROM as 60%.

(4) A value of a disturbance variable $K_{am}$ is, as shown in FIG. 7, calculated by CPU from the following equation (4) in accordance with the binary code signal indicative of the ambient temperature $T_{am}$ from RAM and an ambient temperature coefficient $k_{am}$, the calculated value of the variable $K_{am}$ being stored in RAM.

$$K_{am}=k_{am} \cdot T_{am} \ldots \qquad (4)$$

The coefficient $k_r$ is experimentally determined in consideration with the performance of the air conditioner and previously stored in ROM together with the equation (4). A value of a variable $M_x$ is calculated by CPU from the following equation (5) in accordance with the binary code signal indicative of the ambient temperature $T_{am}$ from RAM and a coefficient $\gamma$, the calculated value of the variable $M_x$ being stored in RAM.

$$M_x = \gamma \cdot T_{am} \ldots \qquad (5)$$

The coefficient $\gamma$ is experimentally determined in consideration with the performance of the air conditioner such that opening degree of the air-blend door 18 may be controlled under deactivation of the compressor 24 to approach temperature of air through the evaporator 15 from the second inlet 12 toward 0° C. The coefficient $\gamma$ and equation (5) are previously stored in ROM respectively.

A value of a variable $M_{sx}$ is also calculated by CPU from the following equation (6) in accordance with the binary code signal indicative of the ambient temperature $T_{am}$ from RAM and a coefficient $\epsilon$, the calculated value of the variable $M_{sx}$ being stored in RAM.

$$M_{sx} = \epsilon \cdot T_{am} \ldots \qquad (6)$$

The coefficient $\epsilon$ is experimentally determined in consideration with the performance of the air conditioner such that under deactivation of the compressor 24, the predetermined relationship defining the switch-over timing of the second switch door 21 may be compensated on a basis of temperature of air through the evaporator 15 from the second inlet 12 to ensure switch-over of the door 21 at the predetermined temperature 30° C. of air discharged into the compartment 10a. The coefficient $\epsilon$ and equation (6) are previously stored in ROM.

(5) A value of a command variable $K_2$ is, as shown in FIG. 7, calculated by CPU from the following equation (7) in accordance with the binary code signal indicative of the selected temperature $T_2$ from RAM and a command temperature coefficient $k_2$, the calculated value of the variable $K_2$ being stored in RAM.

$$K_2 = k_2 \cdot T_2 \ldots \qquad (7)$$

The coefficient $k_2$ is experimentally determined as a predetermined value indicative of one in consideration with the performance of the air conditioner and previously stored in ROM together with the equation (7).

(6) A value of a second feed-back variable $K_{po}$ is, as shown in FIG. 7, calculated by CPU from the following equation (8) in accordance with the binary code signal indicative of the door opening degree $T_{po}$ from RAM and a coefficient $k_{po}$, the calculated value of the variable $K_{po}$ being stored in RAM.

$$K_{po} = k_{po} \cdot T_{po} \ldots \qquad (8)$$

The coefficient $k_{po}$ is experimentally determined in consideration with the performance of the air conditioner and previously stored in ROM together with the equation (8).

(7) The binary code signal indicative of the instant in-car temperature $T_r$ is read out from RAM and applied to the indicator 160 through the I/O ports $R_{12}$ to $R_{15}$ of computer 100.

(8) CPU discriminates operation of the first mode switch 65 on a basis of the low and high level signals applied to the input port $K_0$ from the amplifier 141. Under generation of the low level signal from amplifier 141, CPU discriminates opening of the switch 65 to produce a high level signal at the I/O port $R_8$. Thereafter, CPU discriminates operation of each of the second and fourth mode switches 66, 68 on a basis of each of the low and high level signals applied to the ports $K_1$, $K_2$ respectively from amplifiers 142, 143. Under generation of the high level signal from amplifier 142, CPU discriminates closure of the switch 66 to produce a low level signal at the I/O port $R_9$. Under generation of the low level signal from amplifier 142, CPU discriminates operation of the fourth mode switch 68 on a basis of the low and high level signals applied to the input port $K_3$ from amplifier 144. Under generation of the high level signal from amplifier 144, CPU discriminates temporal closure of the switch 68 to start the second timer. At the same time, the temporal closure of switch 68 is stored in RAM as a value and erased from RAM upon stop of the second timer.

After generation of the low level signal at the I/O port $R_9$ or start of the second timer, the stored value of the variable $M_i$ is read out from RAM by CPU and determined as a second compensation variable $M_F$ described below. The predetermined door opening degree D is also read out from ROM and compensated as a subtracted value S by using the following equation (9) in accordance with the value of the variable $M_{si}$ from RAM.

$$S = D - M_s \ldots \qquad (9)$$

In this case, the value of the variable $M_{si}$ is determined as the value $M_s$ of the equation (9). Additionally, the equation (9) is previously stored in ROM. When CPU reads out the value of the variable $K_{po}$ from RAM, it discriminates as to whether or not the value of variable $K_{po}$ is larger than the subtracted value S. If the value of variable $K_{po}$ is larger than the subtracted value S, CPU produces a high level signal at the I/O port $R_7$. If the value of variable $K_{po}$ is smaller than the subtracted value S, CPU produces a low level signal at the I/O port $R_7$.

(9) Under generation of each low level signal from amplifiers 141, 142, 144, CPU discriminates opening of the fourth mode switch 68 to produce a high level signal at the I/O port $R_9$. Then, the stored value of variable $M_x$ is read out from RAM by CPU and determined as the second compensation variable $M_F$. The predetermined door opening degree D is also read out from ROM and compensated as the subtracted value S by using the equation (9) in accordance with the value of variable $M_{sx}$ from RAM. In this case, the value of variable $M_{sx}$ is determined as the value $M_s$. Thereafter, CPU produces the low and high level signals to control the second switch door 21, as previously described.

(10) Under closure of the first mode switch 65, CPU discriminates operation of the third mode switch 76 on a basis of the low and high level signals applied to the input port $K_2$ from amplifier 143. During generation of the low level signal from amplifier 143, CPU discriminates opening of the third mode switch 67 to produce a low level signal at the I/O port $R_8$ of computer 100. Then, CPU determines the variable $M_F$ as zero and discriminates operations of the second and fourth mode switches 66, 68 to control the first switch door 13 and the second timer, as previously described. Thereafter, the predetermined door opening degree D is determined as S to control the second switch door 21, as previously described.

Figure 13:
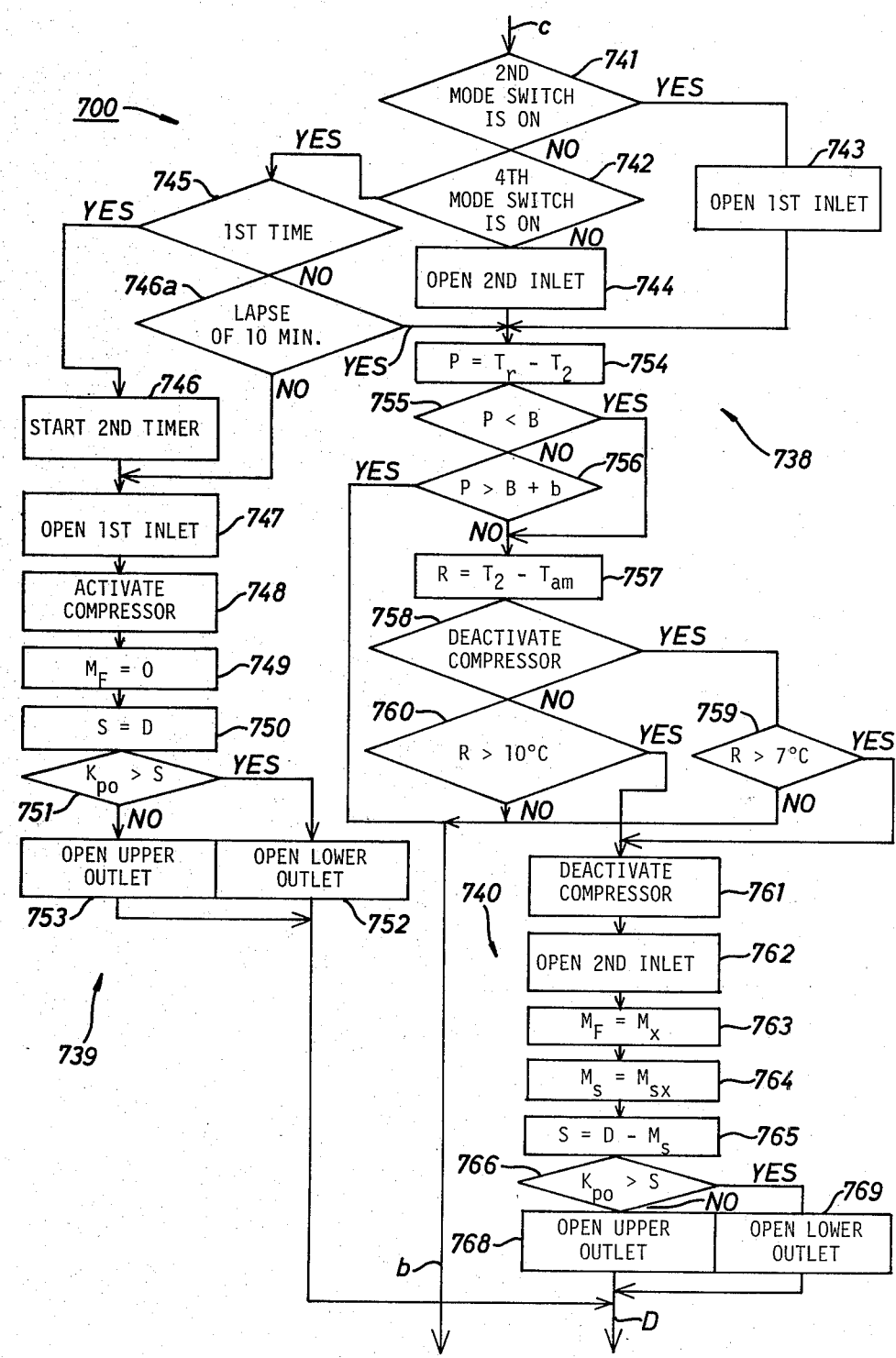

(11) Under closure of each of the first and third mode switches 65, 67, CPU discriminates operations of the second and fourth mode switches 66, 68 to control the first switch door 13 and the second timer, as similar to the above described (See FIG. 13). After start of the second timer, CPU produces the low level signal at the I/O port $R_8$ and determines the variable $M_F$ as zero. Then, the predetermined opening degree D is determined as S to control the second switch door 21, as previously described.

After control of the first switch door 13 under respectively closing and opening the second and fourth mode switches 66, 68, as previously described, CPU calculates a subtracted value P from the following equation (10) in accordance with the in-car and selected temperatures $T_r$, $T_2$ from RAM.

$$P = T_r - T_2 \ldots \quad (10)$$

The equation (10) is previously stored in ROM. Thereafter, CPU discriminates whether or not the subtracted value P is in a value between predetermined values B, B+b. The value B is experimentally determined to discriminate necessity for activating the compressor 24. The value b is also experimentally determined to provide hysteresis for preventing oscillation between activation and deactivation of the compressor 24. In this embodiment, the values B, B+b are stored in ROM respectively as 1.6° C. and 2.6° C.

If the subtracted value P is larger than the value B+b, CPU descriminates that activation of the compressor 24 is necessary and executes to conduct activation of the compressor 24 and control of the switch doors 13, 21, as previously described. If the value P is smaller than each of the values B, B+b, CPU discriminates activation of the compressor 24 is unnecessary. Then, CPU calculates a subtracted value R from the following equation (11) in accordance with the selected and ambient temperatures $T_2$, $T_{am}$ from RAM.

$$R = T_2 - T_{am} \ldots \quad (11)$$

The equation (11) is previously stored in ROM. In the equation (11), the value R is calculated to discriminate unnecessity of activation of the compressor 24 in relation to the ambient temperature. If the value R is respectively larger than 7° C. under deactivation of the compressor and 10° C. under activation of the compressor 24, CPU discriminates activation of the compressor 24 is unnecessary. Then, CPU executes to conduct deactivation of the compressor 24 and control the switch doors 13, 21, in the same as the abovenoted execution under opening the switches 65, 66, 68. If the value R is respectively smaller than 7° C. under deactivation of the compressor 24 and 10° C. under activation of the compressor 24, CPU discriminates activation of the compressor 24 is necessary.

(11) A value of an estimation variable $K_1$ is calculated by CPU from the following equation (12) in accordance with the values of variables $K_1$, $K_{am}$, $K_{po}$ from RAM. In this case, the first compensation variable $C_F$ is initially determined as zero, as previously described. Thereafter, the variable $C_F$ is compensated as below in detail. The variable $M_F$ is selectively determined as zero, $M_i$, $M_x$, as previously described.

$$K_1 = K_r + K_{am} + K_{po} + C_F + M_F \ldots \quad (12)$$

CPU also calculates a deviation $\Delta K_{po}$ from the following equation (13) in accordance with the values of variables $K_1$, $K_2$ (See FIG. 7).

$$\Delta K_{po} = K_2 - K_1 \ldots \quad (13)$$

The equations (12), (13) are experimentally obtained and stored in ROM.

Figure 15:
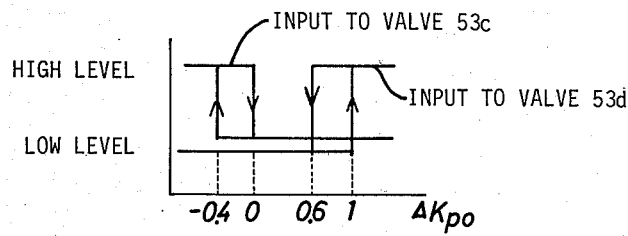
FIG. 15 is a graph illustrating operation of the solenoid valves in relation to a deviation $\Delta K_{po}$.
Figure 16:
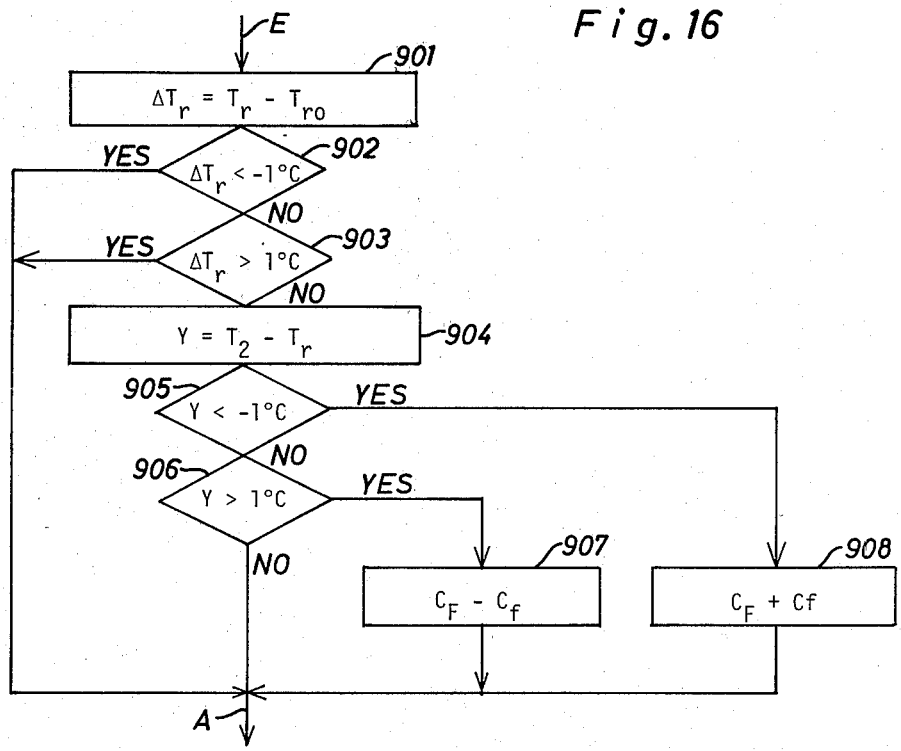
FIG. 16 is a detailed flow diagram illustrating the programming of the computer.

CPU produces high level signals at the I/O ports $R_{10}$, $R_{11}$ while the deviation $\Delta K_{po}$ is in a value between 0° C. and 0.6° C. CPU produces a low level signal at the I/O port $R_{10}$ when the deviation $\Delta K_{po}$ becomes smaller than $-0.4°$ C. When the deviation $\Delta K_{po}$ becomes larger than 1° C., CPU produces a low level signal at the I/O port $R_{11}$. As shown in FIG. 15, the deviation $\Delta K_{po}$ between $-0.4°$ C. and 0° C. provides hysteresis for preventing oscillation between energization and deenergization of the solenoid valve 53c, whereas the deviation $\Delta K_{po}$ between 0.6° C. and 1° C. provides hysteresis for preventing oscillation between energization and deenergization of the solenoid valve 53d. When the deviation $\Delta K_{po}$ is in a value between 0° C. and 0.6° C. or between $-0.4°$ C. and 1° C., CPU discriminates lapse of two minutes after start of the first timer to determine whether or not the abovenoted execution is repeated.

(12) CPU calculates a subtracted value $\Delta T_r$ from the following equation 14 in accordance with the initial and instant in-car temperatures $T_{ro}$, $T_r$ from RAM.

$$\Delta T_r = T_r - T_{ro} \ldots \quad (14)$$

The equation (14) is previously stored in ROM. CPU also discriminates whether or not the subtracted value $\Delta T_r$ is in a value between $-0°$ C. and 1° C. If the value $\Delta T_r$ is not in the value between $-1°$ C. and 1° C., CPU conducts repetition of the above-noted execution. If the value $\Delta T_r$ is in the value between $-1°$ C. and 1° C., this means the in-car temperature is stabilized, and CPU calculates a subtracted value Y from the following equation (15) in accordance with the selected and instant in-car temperatures $T_2$, $T_r$.

$$Y = T_2 - T_r \ldots \quad (15)$$

The equation (15) is previously stored in ROM.

CPU discriminates whether or not the subtracted value Y is in a value between $-1°$ C. and $1°$ C. If the value Y is in the value between $-1°$ C. and $1°$ C., this means the in-car temperature is converged in a range from $(T_2-1)°$ C. to $(T_2+1)°$ C. If the value Y is smaller than $-1°$ C., the compensation variable $C_F$ is compensated as a total of a value $C_f$ and a value of the variable $C_F$ to repeat the abovenoted execution. If the value Y is larger than $1°$ C., the variable $C_F$ is also compensated as a subtraction of a value of the variable $C_F$ and the value $C_f$. The value $C_f$ is experimentally determined and stored in ROM as, for example, $0.8°$ C. In practice of the present invention, a microcomputer of MB 8841 type manufactured by FUJITSU LIMITED in Japan has been used as the computer 100 due to its commercial availability. Detail description regarding the microcomputer is eliminated because the particular construction and programming process are well known in prior arts.

Figure 5:
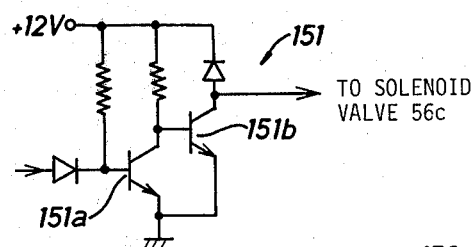
FIGS. 5 and 6 are respectively circuit diagrams of the amplifiers shown in block form in FIG. 2.

An amplifying circuit 150 comprises amplifiers 151 to 155 connected respectively to the I/O ports $R_7$ to $R_{11}$ of computer 100. As shown in FIG. 5, the amplifier 151 is provided with a pair of transistors 151a, 151b. The transistor 151a receives the low level signal from the computer 100 through a diode to be turned off. The transistor 151a also receives the high level signal from the computer 100 through the diode to be turned on. The transistor 151b is turned on due to nonconduction of transistor 151a such that the solenoid valve 56c is supplied with electric power from electric source 3 through the switches 4, 64 to be energized. The transistor 151b is also turned off due to conduction of the transistor 151a such that the solenoid valve 56c is blocked from electric power supply of electric source 3 to be deenergized. Each of the amplifiers 153 to 155 has the same construction and function as those of the amplifier 151. The amplifiers 153, 154, 155 receive the low level signals from computer 100 respectively such that the solenoid valves 51c, 53c, 53d are supplied with electric power from electric source 3 through the switches 4, 64 to be energized. The amplifiers 153, 154, 155 also receive the high level signals from computer 100 respectively such that the solenoid valves 51c, 53c, 53d are blocked from electric power supply of electric source 3 to be deenergized.

Figure 6:
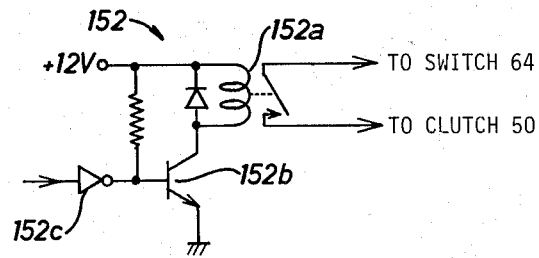

As shown in FIG. 6, the amplifier 152 is provided with a transistor 152b which has a base connected to the I/O port $R_8$ of computer 100 through an inverter 152c and a collector connected to the power supply circuit 170 through a diode. The inverter 152c functions to invert the output signal from the computer 100. The transistor 152b is turned on in response to a high level signal from inverter 152c to produce therefrom a low level signal. The transistor 152b is also turned off in response to a low level signal from inverter 152c to produce a high level signal. A relay 152a is provided with an electromagnetic coil connected between the power supply circuit 170 and the collector of transistor 152b and with a normally open switch connected between the main switch 64 and the clutch 50. When the coil of relay 152a is energized in response to the low level signal from transistor 152b, the switch of relay 152a is closed to supply the clutch 50 with electric power from electric source 3 through the switches 4, 64 to energize the same. When the coil of relay 152a is deenergized in response to the high level signal from transistor 152b, the switch of relay 152a is opened to disconnect the clutch 50 from the switch 64 so as to deenergize the same.

An indicator 160 includes a signal converter 161 which serves to convert the binary code signal from the I/O ports $R_{12}$ to $R_{15}$ of computer 100 into a decade code signal indicative of the instant in-car temperature $T_r$. The indicator 160 also includes a plurality of light emission diodes 162 which are connected to the signal converter 161 respectively through resistors. Some of the diodes 162 are turned on upon receiving the decade code signal from converter 161 to indicate the in-car temperature $T_r$ defined by the decade code signal.

Hereinafter, various operational modes of the electric control apparatus 1 will be described in detail with reference to flow diagrams shown in FIGS. 8 to 14 and 16. When the ignition switch 4 is actuated, the power supply circuit 170 produces the D.C. voltage of twelve volts and the constant voltage of five volts upon receiving the output voltage from electric source 3. Then, the amplifyling circuit 150 is conditioned in its operation upon receiving the D.C. voltage from power supply circuit 170, and each of the amplifying circuits 110, 140, A-D converter 130, indicator 160 and starter circuit 180 is conditioned in its operation upon receiving the constant voltage from power supply circuit 170. The computer 100 is also conditioned in its operation in response to the constant voltage from power supply circuit 170 to initiate execution of the program at a point 300 of FIG. 8. Then, the computer 100 is reset by a reset signal issued from the starter circuit 180, and the first and second timers in computer 100 are also respectively reset at a point 400. Simultaneously, the initial value of the variable $C_F$ is determined as zero and stored in RAM. When the main switch 64 is actuated, the blower 14 is driven by the output voltage from electric source 3, and each of the clutch 50 and solenoid valves 51c, 53c, 53d, 56c is conditioned in its operation upon receiving the output voltage from the electric source 3.

Figure 8:
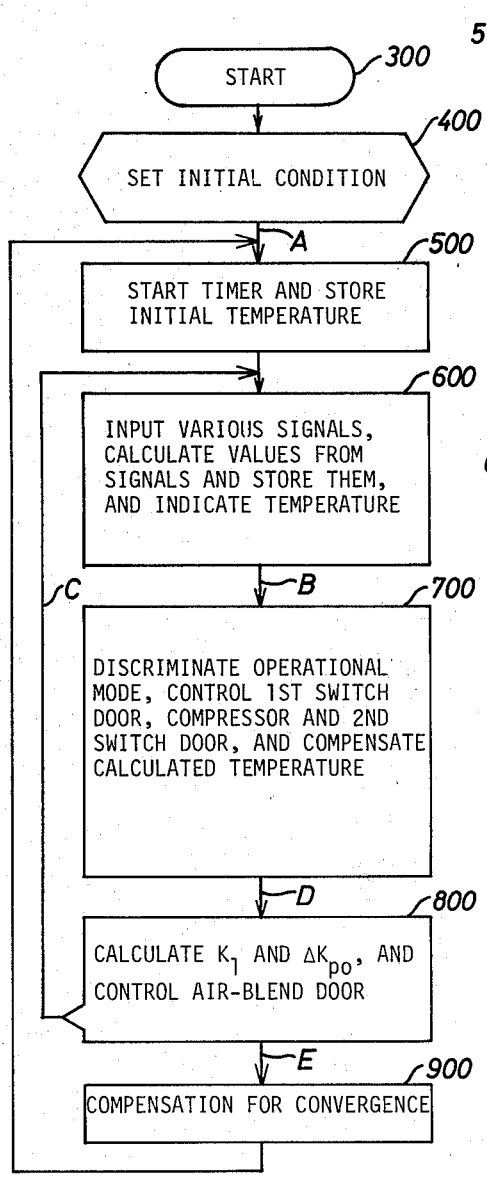
FIG. 8 is a flow diagram illustrative of operation of the digital computer shown in block form in FIG. 2.
Figure 9:
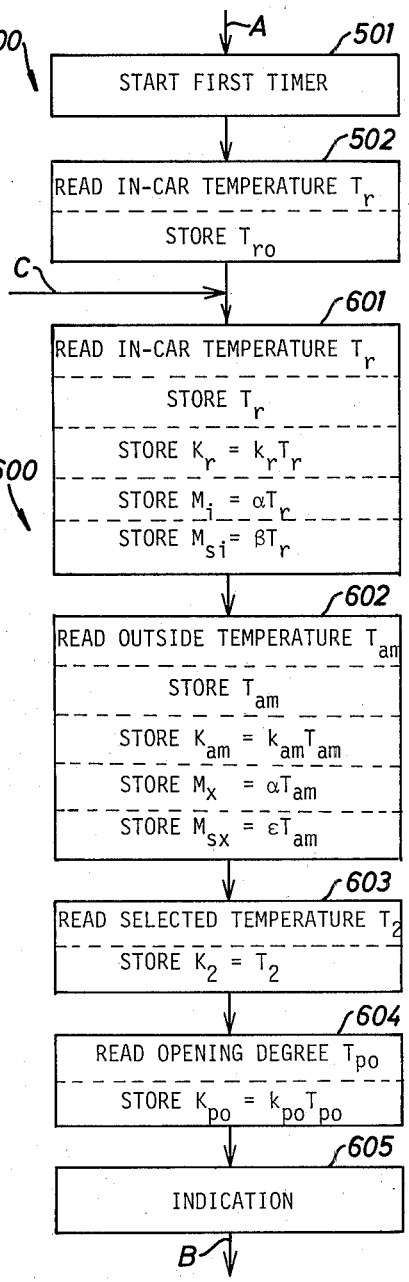
FIGS. 9 to 14 are detailed flow diagrams respectively illustrating the programming of the digital computer.

When the computer program proceeds to a first routine 500 shown by an arrow-marked line A in FIGS. 8, 9, the first timer in computer 100 starts to count clock signals from the clock circuit at a point 501, the program proceeding to a point 502. When instant temperature $T_r$ of air in the passenger compartment 10a is detected by the in-car sensor 60, it is amplified by the pre-amplifier 110 and applied to the analog switch 121 as an instant analog voltage. When control and binary code signals are respectively produced from the I/O and output ports $R_0$, $O_0$ to $O_7$ of computer 100, the control signal is inverted by the inverter 125 and applied as a high level signal to the analog switch 121, and the binary code signal is applied to the voltage generator 132. Then, the instant analog voltage from pre-amplifier 111 is applied by the analog switch 121 to the comparator 131 in response to the high level signal from inverter 125, and an analog voltage is produced from the generator 132 in accordance with a value of the binary code signal and is applied to the comparator 131. When the analog voltage from generator 132 becomes higher than the instant analog voltage from analog switch 121, a high level signal is produced from comparator 131 and applied to the computer 100. Thus, the binary code signal corresponding with the analog voltage from analog switch 121 is applied to RAM at a point 502 of FIG. 9 and memorized as a binary code signal indicative of initial in-car temperature $T_{r0}$, thereafter the computer program proceeding to a second routine 600, as shown in FIGS. 8, 9.

When instant temperature $T_r$ of air in the compartment 10a is detected by the in-car sensor 60, it is memorized as a binary code signal in RAM at a point 601, as previously described. Simultaneously, the coefficients $k_r$, $\alpha$, $\beta$ are read out from ROM respectively and multiplied by the instant in-car temperature $T_r$. Then, the multiplied values $k_r \cdot T_r$, $\alpha \cdot T_r$, $\beta \cdot T_r$ are respectively memorized in RAM as values of the variables $K_r$, $M_i$, $M_{si}$, thereafter the program proceeding to a point 602. When instant temperature $T_{am}$ of air outside the automobile is detected by the ambient sensor 61, it is amplified by the pre-amplifier 112 and applied to the analog switch 122 as an instant analog voltage. Control and binary code signals are also respectively produced from the I/O and output ports $R_1$, $O_0$, to $O_7$ of computer 100. Then, the control signal from computer 100 is inverted by the inverter 126 and applied as a high level signal to the analog switch 122, and the binary code signal from computer 100 is applied to the voltage generator 132. Subsequently, the instant analog voltage from pre-amplifier 112 is applied by the analog switch 122 to the comparator 131 in response to the high level signal from inverter 126, and an analog voltage is produced from the generator 132 in accordance with a value of the binary code signal and is applied to the comparator 131.

When the analog voltage from generator 132 becomes higher than the instant analog voltage from analog switch 122, a high level signal is produced from the comparator 131 and applied to the computer 100. Thus, the binary code signal corresponding with the analog voltage from generator 132 is applied to RAM and memorized as a binary code signal indicative of instant ambient temperature $T_{am}$. Simultaneously, the coefficients $k_{am}$, $\gamma$, $\epsilon$ are read out from ROM respectively and multiplied by the instant ambient temperature $T_{am}$. Then, the multiplied values $k_{am} \cdot T_{am}$, $\gamma \cdot T_{am}$, $\epsilon \cdot T_{am}$ are respectively memorized in RAM as values of the variables $K_{am}$, $M_x$, $M_{sx}$, thereafter the program proceeding to a point 603.

When the temperature selector 63 is manipulated to select in-car temperature $T_2$ in a desired value, the in-car temperature $T_2$ is amplified by the pre-amplifier 114 and applied to the analog switch 124 as an analog voltage. Control and binary code signals are also produced from I/O and output ports $R_2$, $O_0$ to $O_7$ of computer 100. Then, the control signal from computer 100 is inverted by the inverter 128 and applied as a high level signal to the analog switch 124, and the binary code signal from computer 100 is applied to the voltage generator 132. Subsequently, the analog voltage from pre-amplifier 114 is applied by the analog switch 124 to the comparator 131 in response to the high level signal from inverter 128, and an analog voltage is produced from the generator 132 in accordance with a value of the binary code signal and is applied to the comparator 131. When the analog voltage from generator 132 becomes higher than the analog voltage from analog switch 124, a high level signal is produced from the comparator 131 and applied to the computer 100. Thus, the binary code signal corresponding with the analog voltage from generator 132 is applied to RAM and memorized as a binary signal indicative of selected in-car temperature $T_2$, then the computer program proceeding to a point 604.

When instant door opening degree $T_{po}$ is detected by the door position sensor 62, it is amplified by the preamplifier 113 and applied to the analog switch 123 as an instant analog voltage. Control and binary code signals are also produced from the I/O and output ports $R_3$, $O_0$ to $O_7$ of computer 100. Then, the control signal from computer 100 is inverted by the inverter 127 and applied as a high level signal to the analog switch 123, and the binary code signal from computer 100 is applied to the voltage generator 132. Subsequently, the analog voltage from pre-amplifier 113 is applied by the analog switch 123 to the comparator 131 in response to the high level signal from inverter 127, and an analog voltage is produced from the generator 132 in accordance with a value of the binary code signal and is applied to the comparator 131. When a high level signal is produced from the comparator 131, the binary code signal is applied to RAM, as previously described, and memorized as a binary code signal indicative of instant door opening degree $T_{po}$. Simultaneously, the coefficient $k_{po}$ is read out from ROM and multiplied by the instant door opening degree $T_{po}$. Then, the multiplied value $k_{po} \cdot T_{po}$ is memorized in RAM as a value of the variable $K_{po}$. When the computer program proceeds to a point 605, the binary code signal indicative of the instant in-car temperature $T_r$ is read out from RAM and applied to the signal converter 161. Then, the binary code signal from RAM is converted by the converter 161 into a decade code signal. Thus, some of the light emission diodes 162 are turned on to indicate the instant in-car temperature $T_r$ as a decade number.

Figure 10:
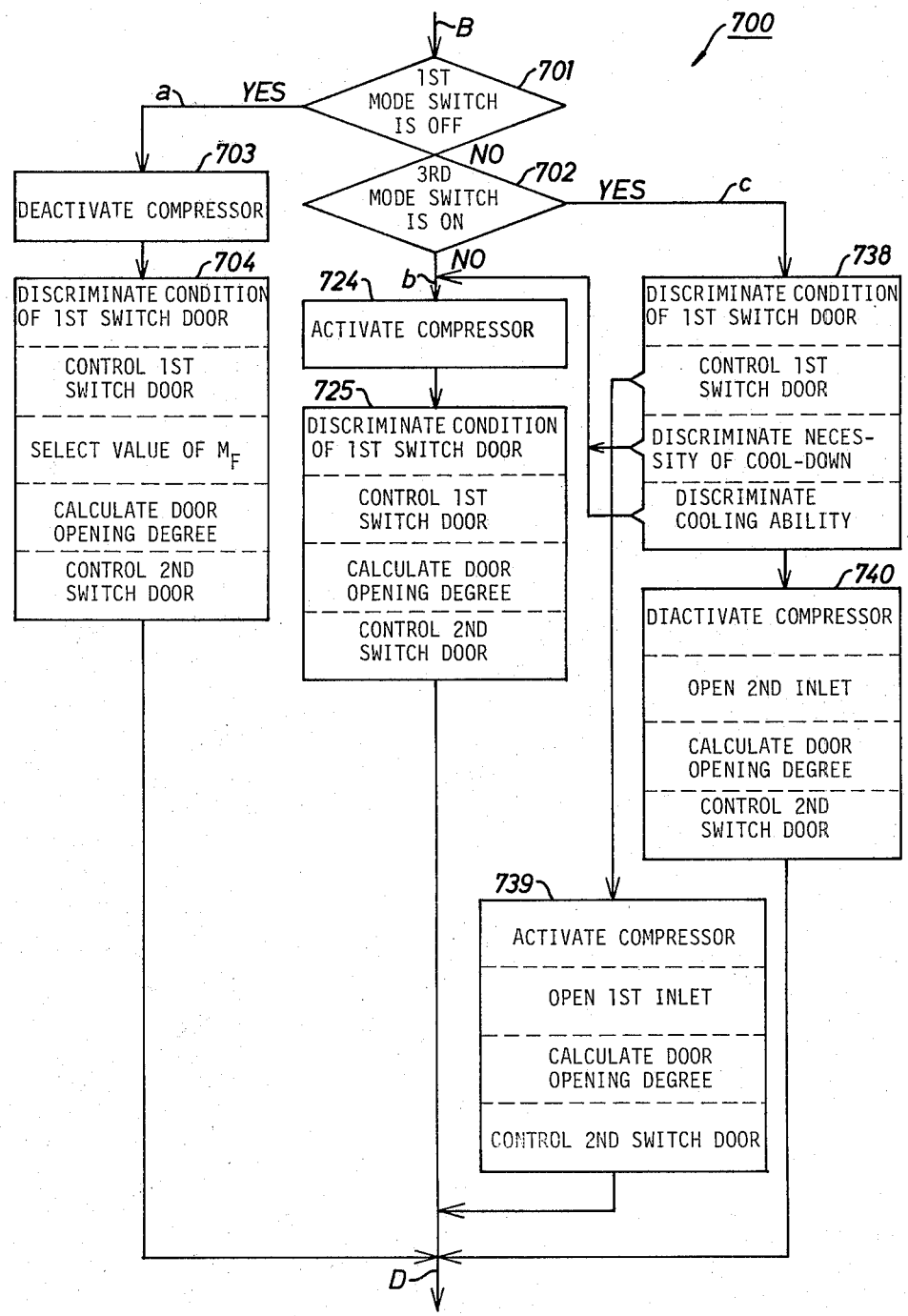

When the computer program proceeds to a third routine 700, as shown by an arrow-marked line B in FIGS. 8, 10, CPU discriminates at point 701 as to whether or not the first mode switch 65 is opened. If the switch 65 is opened, a low level signal is produced from the amplifier 141 and applied to CPU through the input port $K_0$ of computer 100. Then, CPU discriminates as "yes" and proceeds the program to a following point 703, as shown by an arrowmarked line a in FIGS. 10, 11. Subsequently, a high level signal is produced from CPU and applied to the amplifier 152 through the I/O port $R_8$ of computer 100. Thus, the amplifier 152 deenergizes the clutch 50 in response to the high level signal from computer 100 to maintain deactivation of the compressor 24.

Figure 11:
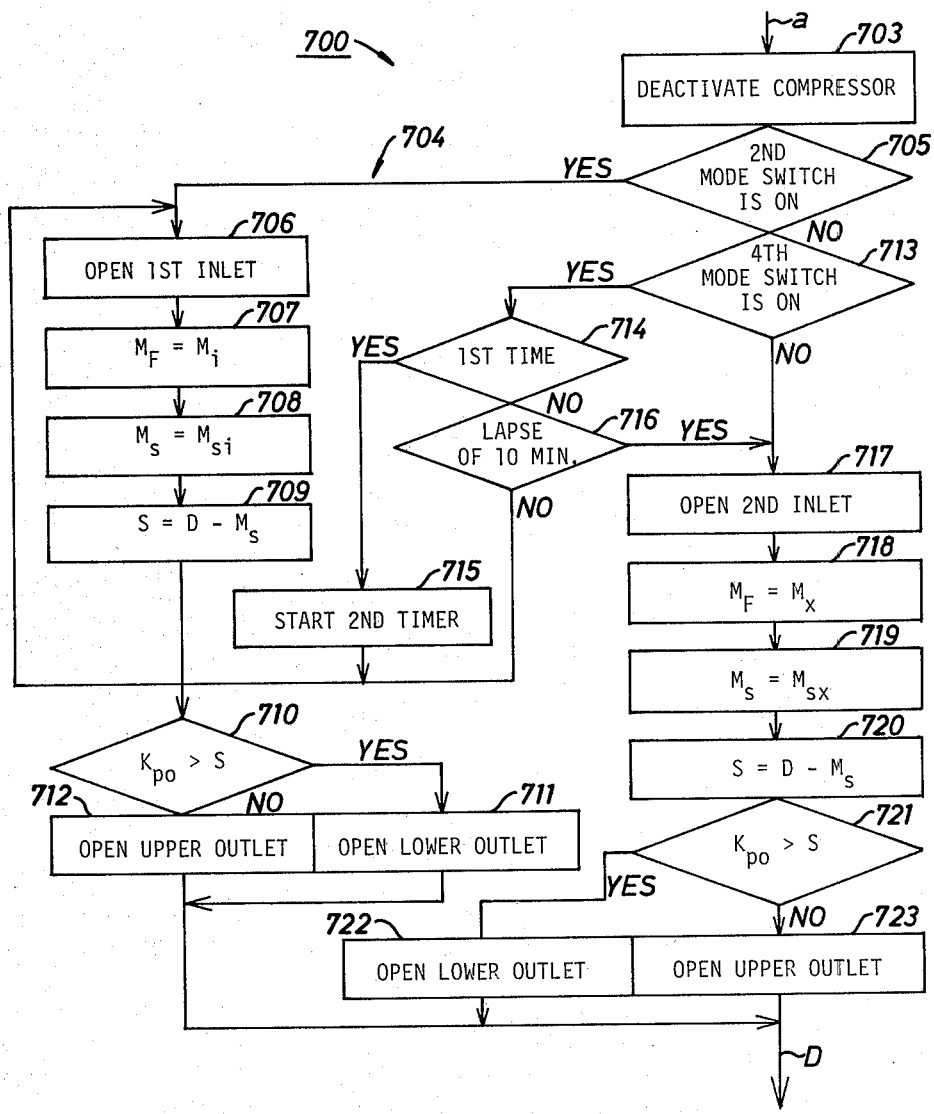

When the computer program proceeds to a subroutine 704, as shown in FIGS. 10, 11, CPU discriminates at a point 705 as to whether or not the second mode switch 66 is closed. If the switch 66 is closed, a high level signal is produced from the amplifier 142 is response to a low level signal from switch 66 and applied to CPU through the input port $K_1$ of computer 100. Then, CPU discriminates as "yes" and proceeds the program to a point 706. Subsequently, a low level signal is produced and applied by CPU to the amplifier 153 through the I/O port $R_9$ of computer 100. Thus, the amplifier 153 energizes the electrically operated vacuum mechanism 51 in response to the low level signal from CPU so that the first switch door 13 is switched over to open the first inlet 11. As a result, air from the compartment 10a is taken into the air duct 10 through the inlet 11.

When the computer program proceeds to a point 707, the stored value of the variable $M_i$ is read out from RAM by CPU and determined as the variable $M_F$, the program proceeding to a point 708. Then, the stored value of the variable $M_{si}$ is read out by CPU from RAM and determined as the variable $M_s$. When the program proceeds to a point 709, the predetermined door opening degree D is read out from ROM by CPU and compensated as a subtracted value S by using the equation (9). Thereafter, CPU discriminates at a point 710 as to whether or not the value of the variable $K_{po}$ from RAM is larger than the subtracted value S. If CPU discriminates as "yes" at point 710, a high level signal is produced by CPU at a point 711 and applied through the I/O port $R_7$ of computer 100 to the amplifier 151. Thus, the amplifier 151 holds deenergization of the electrically operated vacuum mechanism 56 in response to the high level signal from CPU so that the second switch door 21 is held in the position of FIG. 1 to open the lower outlet 20. As a result, air from the air-blend door 18 and heater 16 flows toward a lower portion of the passenger in the compartment 10a. If CPU discriminates as "no" at the above-noted point 710, a low level signal is produced by CPU at a point 712 and applied through the I/O port $R_7$ to the amplifier 151. Thus, the amplifier 151 energizes the vacuum mechanism 56 in response to the low level signal from CPU so that the second switch door 21 is switched over to open the upper outlet 13. As a result, air from the air-blend door 18 and heater 16 flows toward an upper portion of the passenger compartment.

If the second mode switch 66 is opened at the above-noted point 705, a low level signal is produced from the amplifier 142 and applied to CPU through the input port $K_1$ of computer 100. Then, CPU discriminates as "no" and proceeds the program to a point 713, at which CPU discriminates whether or not the fourth mode switch 68 is temporarily closed. If the switch 68 is temporarily closed, a high level signal is produced from the amplifier 144 in response to a low level signal from the switch 68 and applied to CPU through the input port $K_3$ of computer 100. Then, CPU discriminates as "yes" and proceeds the program to a point 715 through a point 714. Subsequently, the second timer in computer 100 is started by CPU, and a value indicative of temporal closure of the switch 68 is memorized in RAM. Thereafter, the program proceeds from point 706 to point 711 or 712, as previously described.

If the fourth mode switch 68 is opened at the above-noted point 713 and a value indicative of closure of the switch 68 is erased from RAM, CPU discriminates as "no" and proceeds the program to a point 717. Then, a high level signal is produced by CPU and applied to the amplifier 153 through the I/O port $R_9$ of computer 100. Thus, the amplifier 153 deenergizes the vacuum mechanism 51 so that the first switch door 13 is switched over to open the second inlet 12. As a result, air outside the automobile is taken into the air duct 10 through the inlet 12. When the computer program proceeds to a point 718, the stored value of variable $M_x$ is read out by CPU and determined as the variable $M_F$, the program proceeding to a point 719. Then, the stored value of variable $M_{sx}$ is read out by CPU and determined as the value $M_s$. After the program has proceeded to point 719, at a point 720 to a point 722 or 723 the computer 100 performs the same execution as that at point 709 to point 710 or 711 to control the second switch door 21, as previously described.

If the first mode switch 65 is closed at the above-noted point 701 of FIG. 10, a high level signal is produced and applied by the amplifier 141 to CPU of the computer 100. Then, CPU discriminates as "no" and proceeds the program to a following point 702. At point 702, CPU discriminates whether or not the third mode switch 67 is closed. If the switch 67 is opened, a low level signal is produced by the amplifier 143 and applied to CPU of computer 100. Then, CPU discriminates as "no" and proceeds the program to a point 724, as shown by an arrow-marked line b of FIGS. 10, 12. When the program proceeds to point 724, as previously described, a low level signal is produced by CPU and applied to the amplifier 152. Then, the amplifier 152 energizes the clutch 50 in response to the low level signal from CPU to activate the compressor 24. Thus, refrigerant gas from evaporator 15 is compressed by the compressor 24 and recirculated to the evaporator 15 through the condenser 25, receiver 26 and expansion value 27. As a result, air from the blower 14 through the evaporator 15 is cooled by refrigerant gas in evaporator 15.

Figure 12:
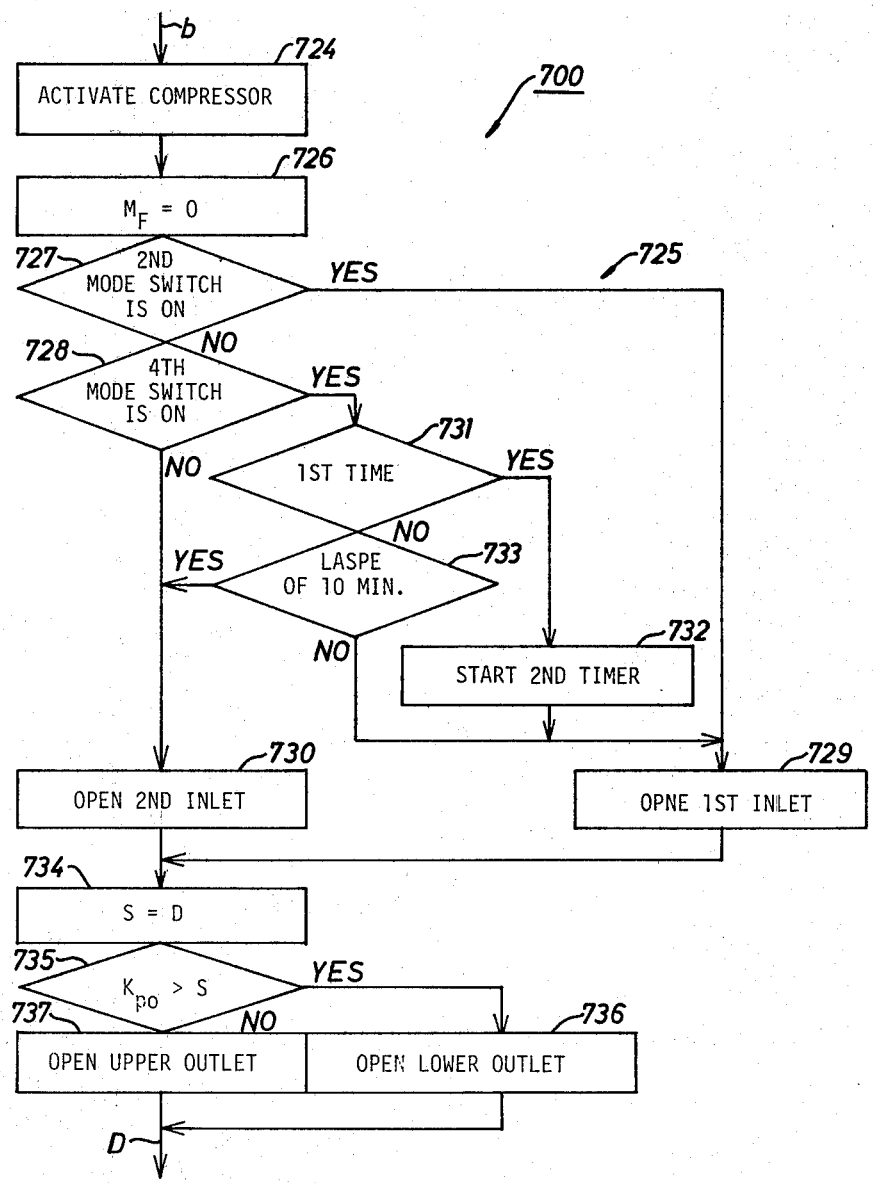

When the computer program proceeds to a subroutine 725 of FIGS. 10, 12, the variable $M_F$ is determined as zero at a point 726, the program proceeding to a point 727. Then, CPU discriminates whether or not the second mode switch 66 is closed. If the switch 66 is closed, CPU discriminates as "yes", as previously described, and a low level signal is produced by CPU and applied to the amplifier 153. Thus, the amplifier 153 energizes the vacuum mechanism 51 so that the first switch door 13 is switched over to open the first inlet 11. As a result, air outside the automobile is taken into the air duct 10 through the inlet 11. If the second mode switch 66 is opened at the above-noted point 727, CPU discriminates as "no", as previously described, and discriminates at a point 728 whether or not the fourth mode switch 68 is temporarily closed. If the switch 68 is temporarily closed, CPU discriminates as "yes" and proceeds the program to a point 732 through a point 731. Then, the second timer in computer 100 is started by CPU, and a value indicative of temporal closure of the switch 68 is memorized in RAM, thereafter the program proceeding to point 729.

If the fourth mode switch 68 is opened at the above-noted point 728 and a value indicative of closure of the switch 68 is not yet stored in RAM, CPU discriminates as "no" and proceeds the program to a point 730. Then, the amplifier 153 deenergizes the vacuum mechanism 51 in response to a high level signal from computer 100 so that the first switch door 13 is switched over to open the second inlet 12. Thus, air outside the automobile is taken into the air duct 10 through the inlet 12. When the computer program proceeds to a point 734 from one of points 729, 730, the predetermined opening degree D is read out from ROM and determined as S, the program proceeding to a point 735. Thereafter, at point 735 to a point 736 or 737 the computer 100 performs the same execution as that at point 710 to point 711 or 712 in FIG. 11 to control the second switch door 21.

If the third mode switch 67 is closed at the above-noted point 702, a high level signal is produced from the amplifier 143 in response to a low level signal from the switch 67 and applied to CPU of computer 100. Then, CPU discriminates as "yes" and proceeds the program to a sub-routine 738, as shown by an arrow-marked line c of FIGS. 10, 13. If the second mode switch 65 is closed at a point 741, CPU discriminates as "yes", as previously described, and proceeds the program to a point 743. Then, a low level signal is produced from the computer 100 and applied to the amplifier 153. Thus, the amplifier 153 energizes the vacuum mechanism 51 so that the first switch door 13 is switched over to open the first inlet 11. If the second mode switch 65 is opened at the above-noted point 741, CPU discriminates as "no", as previously described, and proceeds the program to a point 742.

At point 742, CPU discriminates whether or not the fourth mode switch 68 is temporarily closed. If the switch 68 is temporarily closed, CPU discriminates as "yes" and proceeds the program to a point 746 through a point 745. Then, the second timer is started by CPU, and a value indicative of the temporal closure of the switch 68 is memorized in RAM. When the program proceeds to a point 747 of a subroutine 739, the amplifier 153 energizes the vacuum mechanism 51, as previously described, so that the first switch door 13 is switched over to open the first inlet 11. Then, the program proceeds to a point 748, and the amplifier 152 energizes the clutch 50, as previously described, to activate the compressor 24. Thus, the evaporator 15 receives refrigerant gas from the compressor 24 to cool air from the blower 14 therethrough. Thereafter, the variable $M_F$ is determined as zero, and at points 750 to 752 or 753 the computer 100 performs the same execution as that at points 734 to 736 or 737 in FIG. 12 to control the second switch door 21. If the fourth mode switch 68 is opened at the above-noted point 742 and a value indicative of temporal closure of the switch 68 is not yet stored from RAM, CPU discriminates as "no", as previously described, and proceeds the program to a point 744. Then, the amplifier 153 deenergizes the vacuum mechanism 51, as previously described, to open the second inlet 12.

When the computer program proceeds to a point 754 from one of points 743, 744, the instant and selected in-car temperatures, $T_r$, $T_2$ are read out from RAM by CPU. Then, the selected in-car temperature $T_2$ is subtracted from the instant in-car temperature $T_r$ and obtained as a subtracted value P. If the subtracted value P is smaller than the predetermined value B from ROM, CPU discriminates as "yes" and proceeds the program to a point 757. If the subtracted value P is between the predetermined value B and the predetermined value B+b, CPU discriminates as "no" at each point 755, 756 and proceeds the program to point 757. If the subtracted value P is larger than the predetermined value B+b, CPU discriminates as "yes" at point 756 and proceeds the program to the point 724, as shown by the arrow-marked line b of FIGS. 10, 12, 13. In addition, the above-noted value b provides bysteresis for preventing oscillation between the activation and deactivation of compressor 24.

When the program proceeds from one of points 755, 756 to point 757, as previously described, the instant ambient temperature $T_{am}$ from RAM is subtracted from the selected in-car temperature $T_2$ and obtained as a subtracted value R. When the program proceeds to a point 758, CPU discriminates whether or not the compressor 24 is deactivated. If the compressor 24 is deactivated, CPU discriminates as "yes" and proceeds the program to a point 759. If the subtracted value R is larger than 7° C. from ROM, CPU discriminates as "yes" and proceeds the program to a point 761. If the value R is smaller than 7° C., CPU discriminates as "no" and proceeds the program to point 724, as shown by the line b of FIGS. 10, 12, 13. If the compressor 24 is activated at the above-noted point 758, CPU discriminates as "no" and proceeds the program to a point 760. If the subtracted value R is larger than 10° C. from ROM, CPU discriminates as "yes" and proceeds the program to point 761. If the value R is smaller than 10° C., CPU discriminates as "no" and proceeds the program to point 724 through the line b.

When the computer program proceeds to point 724 from one of points 756, 759, 760, the execution at point 724 and sub-routine 725 is conducted by the computer 100 to activate the compressor 24 and control the first and second switch doors 13, 21, as previously described.

When the computer program proceeds to point 761 from one of points 759, 760, as previously described, a high level signal is produced from the computer 100 and applied to the amplifier 152. Thus, the amplifier 152 deenergizes the clutch 50 to deactivate the compressor 24. Thereafter, another high level signal is produced from the computer 100 at a point 762 and applied to the amplifier 153. Thus, the amplifier 153 deenergizes the vacuum mechanism 51 so that the second inlet 12 is opened by the first switch door 13 to take air outside the automobile into the air duct 10. When the program proceeds to points 763, 764, the values $M_x$, $M_{sx}$ from RAM are respectively determined as the variable $M_F$ and value $M_s$. Thereafter, at points 765 to 767 or 768 the computer 100 performs the same execution as that at points 709 to 711 or 712 in FIG. 11 to control the second switch door 21.

Figure 14:
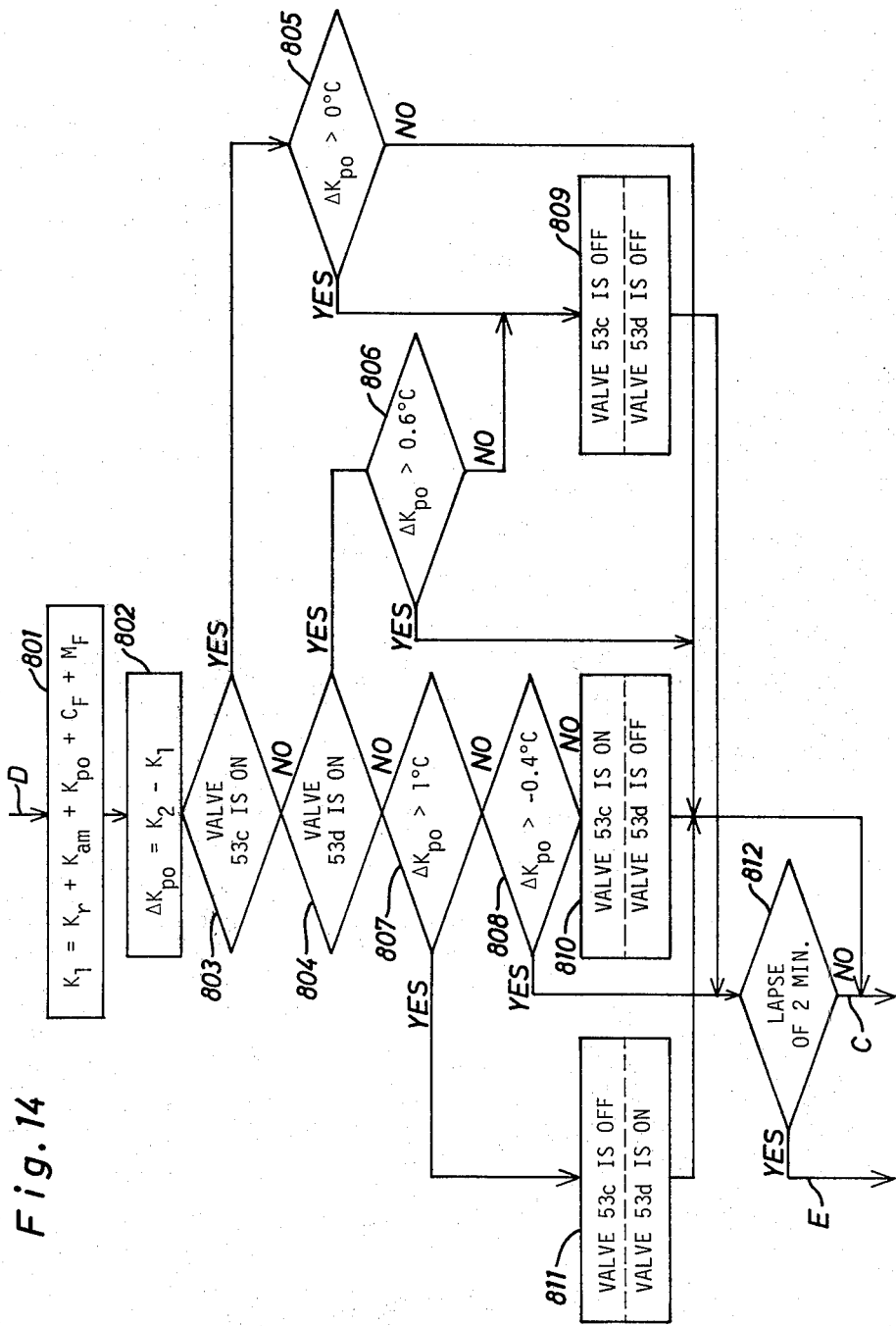

After proceeding to one of the sub-routines 704, 725, 739, 740, as previously described, the computer program proceeds to a fourth routine 800, as shown by the arrow-marked line D in FIGS. 8, 10, 14. If the program proceeds to a point 801 through the point 707 of sub-routine 704, the value of variable $M_F$ is determined as the stored value of variable $M_i$, as previously described, and the stored values of variables $K_r$, $K_{am}$, $K_{po}$ are respectively read out from RAM. At this stage, the variable $C_F$ is determined as zero, as previously described at point 400. Then, a value of variable $K_1$ is calculated from the equation (12) in accordance with the above-noted values of variables $K_r$, $K_{am}$, $K_{po}$, $M_i$. If the program proceeds to point 801 through one of the points 718, 763 of sub-routines 704, 740, the value of variable $M_F$ is determined as the stored value of variable $M_x$, as previously described. Then, a value of variable $K_1$ is calculated from the equation (12) in accordance with the above-noted values of variables $K_r$, $K_{am}$, $K_{po}$, $M_x$. If the program proceeds to point 801 through one of the points 726, 749 of sub-routines 725, 739, the value of variable $M_F$ is determined as zero, as previously described. Then, a value of variable $K_1$ is calculated from the equation (12) in accordance with the above-noted values of variables $K_r$, $K_{am}$, $K_{po}$.

When the program proceeds to a point 802, the stored value of variable $K_2$ is read out from RAM, and a deviation $\Delta K_{po}$ is calculated from the equation (13) in accordance with the read-out value of variable $K_2$ and one of the calculated values of variable $K_1$. Then, the program proceeds to a point 803, and CPU discriminates whether or not the solenoid valve 53c is energized. If the solenoid valve 53c is energized, CPU discriminates as "yes" and proceeds the program to a point 805. If the deviation $\Delta K_{po}$ is smaller than 0° C., CPU discriminates as "no" and returns the program to the second routine 600 under energization of the solenoid valve 53c, as shown by an arrow-marked line C in FIGS. 8, 14. If the deviation $\Delta K_{po}$ is larger than 0° C. at point 805, CPU discriminates as "yes" and proceeds to a point 809. Then, a high level signal is produced and applied by CPU to the amplifier 154 through the I/O port $R_{10}$ of computer 100. Thus, the amplifier 154 deenergizes the solenoid valve 53c so that the servomotor 53b is isolated from the engine intake manifold. Thereafter, the program proceeds to a point 812.

If the solenoid valve 53c is deenergized at the above-noted point 803, CPU discriminates as "no" and proceeds the program to a point 804. Then, CPU discriminates whether or not the solenoid valve 53d is energized. If the solenoid valve 53d is energized, CPU discriminates as "yes" and proceeds the program to a point 806. If the deviation $\Delta K_{po}$ is smaller than 0.6° C., CPU discriminates as "no" and proceeds the program to point 809. Then, a high level signal is produced and applied by CPU to the amplifier 155 through the I/O port $R_{11}$ of computer 100. Thus, the amplifier 155 deenergizes the solenoid valve 53d so that the servomotor 53b is isolated from the exterior. Thereafter, the program proceeds to point 812. If the deviation $\Delta K_{po}$ is larger than 0.6° C., CPU discriminates as "yes" and returns the program to the second routine 600 under energization of the solenoid valve 53d through the line C.

As understood from the above description, if the deviation $\Delta K_{po}$ is in a value between 0° C. and 0.6° C., the servomotor 53b maintains opening degree of the air-blend door 18 in a value due to deenergization of the solenoid valves 53c, 53d, as shown in FIGS. 14, 15. If the deviation $\Delta K_{po}$ is smaller than 0° C., the servomotor 53b is supplied with vacuum pressure from the intake manifold through the solenoid valve 53c so that opening degree of the air-blend door 18 is decreased to decrease an amount of air from the evaporator 15 to the heater 16. This continues until the solenoid valve 53c is deenergized under repetitive executions from the routine 600 to the routine 800. If the deviation $\Delta K_{po}$ is larger than 0.6° C., the servomotor 53b is supplied with the atmospheric pressure from the exterior through the solenoid valve 53d so that opening degree of the air-blend door 18 is increased to increase an amount of air from the evaporator 15 to the heater 16. This continues until the solenoid valve 53d is deenergized under repetitive executions from the routine 600 to the routine 800.

If the solenoid valve 53d is deenergized at the above-noted point 804, CPU discriminates as "no" and proceeds the program to a point 807. If the deviation $\Delta K_{po}$ is larger than 1° C., CPU discriminates as "yes" and proceeds the program to a point 811. Then, a low level signal is produced and applied by CPU to the amplifier 155. Thus, the amplifier 155 energizes the solenoid valve 53d. Thereafter, the program returns to the routine 600 through the line C. If the deviation $\Delta K_{po}$ is smaller than 1° C. at point 807, CPU discriminates as "no" and proceeds the program to a point 808. If the deviation $\Delta K_{po}$ is smaller than $-0.4$° C., CPU discriminates as "no" and proceeds the program to a point 810. Thus, the amplifier 154 energizes the solenoid valve 53c, as previously described. Thereafter, the program returns to the routine 600. If the deviation $\Delta K_{po}$ is larger than $-0.4$° C., CPU discriminates as "yes" and proceeds the program to point 812.

As described from the above description, when the deviation $\Delta K_{po}$ is in a value between $-0.4$° C. and 1° C., the servomotor 53b maintains opening degree of the air-blend door 18 in a value due to deenergization of the solenoid valves 53c, 53d. When the deviation $\Delta K_{po}$ is larger than 1° C., the servomotor 53b is supplied with the atmospheric pressure from the exterior so that opening degree of the air-blend door 18 is increased, as previously described. This continues until the solenoid valve 53d is deenergized under repetitive executions from the routine 600 to the routine 800. When the deviation $\Delta K_{po}$ is smaller than $-0.4$° C., the servomotor 53b is supplied with vacuum pressure from the intake manifold so that opening degree of the air-blend door 18 is decreased, as previously described. This continues until the solenoid valve 53c is deenergized under repetitive executions from the routine 600 to the routine 800.

When the computer program proceeds to point 812 from one of points 808, 809, as previously described, CPU discriminates whether or not two minutes lapse after start of the first timer in the computer 100. If two minutes do not lapse after start of the first timer, CPU discriminates as "no" and returns the program to the routine 600 through the line C. If two minutes lapse after start of the first timer, this means that opening degree of the air-blend door 18 is stabilized to maintain in-car temperature $T_r$ in a value. Then, CPU discriminates as "yes" and proceeds the program to a fifth routine 900, as shown by an arrow-marked line E in FIGS. 8, 14.

When the computer program proceeds to the fifth routine 900, as previously described, the initial and instant in-car temperatures $T_{ro}$, $T_r$ are respectively read out from RAM at a point 901. Then, the initial in-car temperature $T_{ro}$ is subtracted from the instant in-car temperature $T_r$ and obtained as a difference $\Delta T_r$. When the program proceeds to a point 902, CPU discriminates whether or not the difference $\Delta T_r$ is smaller than $-1$° C. If the difference $\Delta T_r$ is smaller than $-1$° C., CPU discriminates as "yes" and returns the program to the first routine 500 through the arrow-marked line A in FIGS. 8, 16. If the difference $\Delta T_r$ is larger than $-1$° C., CPU discriminates as "no" and proceeds the program to a point 903. If the difference $\Delta T_r$ is larger than 1° C., CPU discriminates as "yes" and returns the program to the first routine 500 through the line A. If the difference $\Delta T_r$ is smaller than 1° C., CPU discriminates as "no" and proceeds the program to a point 904.

As understood from the above description, if the difference $\Delta T_r$ is smaller than $-1$° C. or larger than 1° C., this means that instant in-car temperature $T_r$ is not yet stabilized. Thus, execution from the first routine to the point 903 of fifth routine 900 is repeated to control the difference $\Delta T_r$ in a value between $\pm 1$° C. If the difference $\Delta T_r$ is in a value between $\pm 1$° C., this means that instant in-car temperature $T_r$ is stabilized.

When the program proceeds to point 904, as previously described, the selected temperature $T_2$ is read out from RAM. Then, the instant temperature $T_r$ is subtracted from the selected temperature $T_2$ and obtained as a difference Y. Thereafter, CPU discriminates at a point 905 as to whether or not the difference Y is smaller than $-1$° C. If the difference Y is smaller than $-1$° C., CPU discriminates as "yes" and proceeds the program to a point 908. Then, the value $C_f$ is read out from ROM and added to the compensation variable $C_F$ indicative of zero, and the added value $C_f$ is newly determined as the compensation variable $C_F$, the program returning to the first routine 500 through the line A. If the difference Y is larger than $-1$° C. at point 905, CPU discriminates as "no" and proceeds the program to a point 906. If the difference Y is larger than 1° C., CPU discriminates as "yes" and proceeds the program to a point 907. Then, the value $C_f$ is subtracted from the compensation variable $C_F$, and the subtracted value $-C_f$ is newly determined as the compensation variable $C_F$, the program returning to the first routine 500. If the difference Y is smaller than 1° C. at point 906, CPU discriminates as "no" and returns the program to the first routine 500.

As understood from the above description, if the difference Y is in a value between $\pm 1$° C., this means the instant in-car temperature $T_r$ is substantially converged to the selected temperature $T_2$. Thus, the passenger can smoothly drive the automobile under comfortable in-car temperature. If the difference Y is smaller than −1° C. or larger than 1° C., execution from the first routine 500 to the fifth routine 900 is repetitively conducted to control the difference Y in a value btween ±1° C. In addition, the value indicative of the temporal closure of the fourth mode switch 68 is erased from RAM upon lapse of 10 minutes after start of the second timer.

Although in the above embodiment the time interval for conducting execution of the fifth routine 900 is defined about as two minutes, it may be modified in necessity. In this case, the temperature range for discriminating the difference Y may be changed narrower than −1° C. to 1° C., and the value $C_f$ may be also smaller than 0.8° C. or changed in relation to Y, thereby to ensure precise convergence of in-car temperature $T_r$ toward selected temperature $T_2$.

While in the above embodiment ambient temperature $T_{am}$ of air outside the automobile is considered as disturbance for calculating the estimation variable $K_1$, travel speed of the automobile, number of the passenger and the like may be considered as the disturbance in addition to the ambient temperature $T_{am}$.

For practice of the present invention, the execution at points 901 to 903 in computer 100 may be modified to discriminate whether or not changing rate of instant in-car temperature $T_r$ in relation to time is below a predetermined value.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electric control method for an automobile air conditioner including an air duct for allowing the flow of air into a passenger compartment of the automobile, an evaporator arranged within said air duct and connected with a refrigerant compressor for cooling the air flowing therethrough, a heater arranged within said air duct for warming a portion of the cooled air flowing through said evaporator into said compartment, an air-blend door arranged between said evaporator and said heater for controlling an amount of the cooled air flowing through said heater and controlling an amount of the cooled air directly flowing into said compartment, and control means for controlling the opening degree of said air-blend door to direct the actual in-car temperature toward a desired temperature, said method comprising the steps of:

producing a first electric binary signal indicative of the actual in-car temperature;
producing a second electric binary signal indicative of the actual temperature outside the automobile;
calculating a value indicative of an estimated temperature required to direct the actual in-car temperature toward the desired temperature by a digital computer programmed to calculate said value from a function describing a desired relationship between the estimated temperature and an in-car temperature in consideration with a temperature outside the automobile, the calculation being performed by using the first and second binary signals;
calculating a deviation between the desired temperature and the estimated temperature by said digital computer programmed to calculate the deviation on the basis of the previous calculated value;
producing an output signal from said digital computer when the deviation is out of a first predetermined range and ceasing the output signal when the deviation is in the first predetermined range, the output signal being applied to said control means to direct the actual in-car temperature toward the desired temperature;
discriminating by said digital computer whether or not a difference between the desired temperature and the actual in-car temperature is in a second predetermined range when the rate of change of the actual in-car temperature is below a predetermined value, said digital computer being programmed to perform the discrimination by using the first binary signal;
compensating the estimated temperature to direct the temperature difference into said second predetermined range; and
continuously repeating the above sequence of steps for controlling the actual in-car temperature in response to any changes in said electric binary signals.

2. An electric control method as claimed in claim 1, wherein the function for calculating a value indicative of the estimated temperature is represented as follows:

$$K_r = k_r \cdot T_r + k_{am} \cdot T_{am}$$

where:
$K_1$ is the estimated temperature,
$k_r$ is an in-car temperature coefficient defined by performance of the air conditioner,
$k_{am}$ is an ambient temperature coefficient defined by performance of the air conditioner,
$T_r$ is the actual in-car temperature, and
$T_{am}$ is the actual temperature outside the automobile;
and wherein the deviation is represented by the following equation:

$$\Delta K_{po} = K_2 - K_1$$

where:
$\Delta K_{po}$ is the deviation, and
$K_2$ is the desired temperature.

3. An electric control method for an automobile air conditioner including an air duct for allowing the flow of air into a passenger compartment of the automobile, an evaporator arranged within said air duct and connected with a refrigerant compressor for cooling the air flowing therethrough, a heater arranged within said air duct for warming the air flowing therethrough, control member for controlling a ratio of the cooled air flowing into said compartment against the warmed air flowing into said compartment to maintain the actual in-car temperature in a desired temperature and, an electrically operated clutch means for connecting said compressor to a prime mover of the automobile upon energization thereof and for disconnecting said compressor from said prime mover upon deenergization thereof, said method comprising the steps of:

producing a first electric binary signal indicative of the actual in-car temperature;
producing a second electric binary signal indicative of the actual temperature outside the automobile;

calculating a first difference between the actual in-car temperature and the desired temperature by a digital computer programmed to calculate the first temperature difference by using the first binary signal and to discriminate whether or not the first temperature difference is in a first predetermined range;

calculating a second difference between the desired temperature and the actual temperature outside the automobile by said digital computer, being further programmed to calculate the second temperature difference by using the second binary signal and to discriminate whether or not the second temperature difference is in a second predetermined range broader than the first predetermined range;

producing a first output signal from said computer when either one of the first and second temperature differences is out of the first or second predetermined range and producing a second output signal from said computer when both the first and second temperature differences are in the first and second predetermined ranges respectively; and energizing said clutch means in response to the first output signal and deenergizing said clutch means in response to the second output signal.

4. An electric control method for an automobile air conditioner including:

an air duct for allowing the flow of air into a passenger compartment of the automobile;

a first switch door arranged within said air duct for selectively allowing the flow of inside air recirculated from the compartment and the flow of outside air from the exterior;

an evaporator arranged within said air duct and connected with a refrigerant compressor for cooling the air flowing through said first switch door;

a heater arranged within said air duct for warming a portion of the cooled air flowing through said evaporator into said compartment;

an air-blend door arranged between said evaporator and said heater for controlling an amount of the cooled air flowing through said heater and controlling an amount of the cooled air directly flowing into said compartment;

control means for controlling the opening angle of said air-blend door to maintain the actual in-car temperature in a desired temperature;

a second switch door arranged downstream of said heater for discharging the conditioned air into the lower portion of said compartment at its first position and for discharging the conditioned air into the upper portion of said compartment at its second position; and an electrically operated mechanism for switching-over said second switch door to the second position from the first position upon energization of said mechanism and for switching-over said second switch door to the first position from the second position upon deenergization of said mechanism, the energization of said mechanism being conducted when the actual opening angle of said air-blend door is smaller than a predetermined angle measured from the fully closed position of said air-blend door to isolate said heater from the cooled air, and the deenergization of said mechanism being conducted when the actual opening angle becomes larger than the predetermined angle;

said control method comprising the steps of:

compensating the predetermined angle in relation to changes of the actual in-car temperature and the actual temperature outside the automobile;

producing first and second output signals respectively when the actual opening angle of said air-blend door is smaller than the compensated angle and is larger than the compensated angle; and selectively conducting energization and deenergization of said electrically operated mechanism in response to the first and second output signals.

5. An electric control apparatus for an automobile comprising an air duct for allowing the flow of air into a passenger compartment of the automobile, an evaporator arranged within said air duct, a refrigerant compressor connected with said evaporator for cooling the air flowing through said air duct, a heater arranged within said air duct for warming a portion of the cooled air flowing through said evaporator into said compartment, an air-blend door arranged between said evaporator and said heater for controlling an amount of the cooled air flowing through said heater and controlling an amount of the cooled air directly flowing into said compartment, control means for controlling the opening degree of said air blend door to direct the actual in-car temperature toward a desired temperature, means for producing a first electric binary signal indicative of the actual in-car temperature, means for producing a second electric binary signal indicative of the actual temperature outside the automobile, a digital computer for calculating from said first and second binary signals a value indicative of an estimated temperature required to direct the actual in-car temperature toward the desired temperature, said digital computer being programmed to calculate said value from a function describing a desired relationship between the estimated temperature and the in-car temperature in consideration with the actual temperature outside the automobile, said digital computer also being programmed to calculate a deviation between the desired temperature and the estimated temperature on the basis of the previous calculated value, means for producing an output signal from said digital computer when the deviation is out of a first predetermined range and ceasing the output signal when the deviation is in the first predetermined range, means for applying the output signal to said control means to direct the actual in-car temperature toward the desired temperature, said digital computer being further programmed to use said first binary signal to discriminate whether or not a difference between the desired temperature and the actual in-car temperature is in a second predetermined range when the rate of change of the actual in-car temperature is below a predetermined value, and means for compensating the estimated temperature to direct the temperature difference into the second predetermined range.

6. An electric control apparatus in accordance with claim 5 including an electrically operated clutch means for connecting said refrigerant compressor to a prime mover of the automobile upon energization thereof and for disconnecting said refrigerant compressor from the prime mover upon deenergization thereof, and means for producing output signals from said digital computer for energizing and deenergizing said clutch means.

7. An electric control apparatus for an automobile air conditioner including:

an air duct for allowing the flow of air into a passenger compartment of the automobile;

a first switch door arranged within said air duct for selectively allowing the flow of inside air recirculated from the compartment and the flow of outside air from the exterior;

an evaporator arranged within said air duct and connected with a refrigerant compressor for cooling the air flowing through said first switch door;

a heater arranged within said air duct for warming a portion of the cooled air flowing through said evaporator into said compartment;

an air-blend door arranged between said evaporator and said heater for controlling an amount of the cooled air flowing through said heater and controlling an amount of the cooled air directly flowing into said compartment;

control means for controlling the opening angle of said air-blend door to maintain the actual in-car temperature in a desired temperature;

a second switch door arranged downstream of said heater for discharging the conditioned air into the lower portion of said compartment at its first position and for discharging the conditioned air into the upper portion of said compartment at its second position; and an electrically operated mechanism for switching-over said second switch door to the second position from the first position upon energization of said mechanism and for switching-over said second switch door to the first position from the second position upon deenergization of said mechanism, the energization of said mechanism being conducted when the actual opening angle of said air-blend door is smaller than a predetermined angle measured from the fully closed position of said air-blend door to isolate said heater from the cooled air, and the deenergization of said mechanism being conducted when the actual opening angle becomes larger than the predetermined angle;

means for compensating the predetermined angle in relation to changes of the actual in-car temperature and the actual temperature outside the automobile;

means for producing first and second output signals respectively when the actual opening angle of said air-blend door is smaller than the compensated angle and is larger than the compensated angle; and means for selectively conducting energization and deenergization of said electrically operated mechanism in response to the first and second output signals.

8. An electric control method of controlling an automobile air conditioner including an air duct for allowing the flow of air into a passenger compartment of the automobile, an evaporator arranged within said air duct and connected with a refrigerant compressor for cooling the air flowing therethrough, a heater arranged within said air duct for warming a portion of the cooled air flowing therethrough from said evaporator into said compartment, an airblend door arranged between said evaporator and said heater for controlling an amount of the cooled air flowing through said heater and controlling an amount of the cooled air directly flowing into said compartment, and control means for controlling the opening degree of said airblend door to direct the actual in-car temperature toward a desired temperature, said method comprising the steps of:

(a) producing a first electric signal indicative of the actual in-car temperature;

(b) producing a second electric signal indicative of the outside ambient temperature;

(c) producing a third electric signal indicative of the desired temperature;

(d) calculating a value indicative of an estimated in-car temperature ($K_1$) based on a function $$(K_1 = f(T_r, T_{am}, C_F))$$

$$(K_1 = f(T_r, T_{am}, C_F))$$

describing a desired relationship among the estimated in-car temperature, the actual in-car temperature, the outside ambient temperature, and a variable $C_F$ indicative of fluctuation of the heat load in the passenger compartment, the calculation being performed by using the first and second electric signals;

(e) calculating a deviation between the desired temperature and the calculated value of the estimated in-car temperature ($K_1$) by using the third electric signal;

(f) producing an output signal when the deviation is out of a first predetermined range and ceasing the output signal when the deviation is in the first predetermined range, the output signal being applied to said control means to direct the actual in-car temperature toward the desired temperature;

(g) discriminating a difference between the desired temperature and the actual in-car temperature in relation to a second predetermined range when the rate of change of the actual in-car temperature is below a predetermined value;

(h) compensating the variable ($C_F$) of said function in a value necessary for directing the temperature difference into said second predetermined range when the temperature difference is out of said second predetermined range; and (i) continuously repeating the above sequence of steps of controlling the actual in-car temperature in response to any change of the electric signals.

9. An electric control method as claimed in Claim 8, wherein said function for calculating a value indicative of the estimated in-car temperature is represented as follows:

$$K_1 = k_r T_r + k_{am} T_{am} + C_F$$

where:
$K_1$ is the estimated in-car temperature,
$k_r$ is an in-car temperature coefficient defined by performance of the air conditioner,
$k_{am}$ is an outside ambient temperature coefficient defined by performance of the air conditioner,
$T_r$ is the actual in-car temperature,
$T_{am}$ is the outside ambient temperature, and
$C_F$ is the variable;

and wherein the deviation is represented by the following equation:

$$K_{po} + K_2 - K_1$$

where:
$K_{po}$ is the deviation, and $K_2$ is the desired temperature.

* * * * *